United States Patent
Park

(10) Patent No.: US 9,575,572 B2
(45) Date of Patent: Feb. 21, 2017

(54) INPUT DEVICE FOR ELECTRONIC DEVICE AND INPUT METHOD USING THE SAME

(71) Applicant: Samsung Electronics Co., Ltd, Gyeonggi-do (KR)

(72) Inventor: Sung-Chul Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 14/150,567

(22) Filed: Jan. 8, 2014

(65) Prior Publication Data
US 2015/0015499 A1 Jan. 15, 2015

(30) Foreign Application Priority Data
Jul. 12, 2013 (KR) .................. 10-2013-0082238

(51) Int. Cl.
| | | |
|---|---|---|
| G06F 3/0354 | (2013.01) |
| G06F 3/041 | (2006.01) |
| G06F 3/0488 | (2013.01) |
| B43K 29/00 | (2006.01) |
| B43K 29/08 | (2006.01) |
| B43K 29/18 | (2006.01) |
| B43K 7/00 | (2006.01) |

(52) U.S. Cl.
CPC .......... *G06F 3/03545* (2013.01); *B43K 7/00* (2013.01); *B43K 29/00* (2013.01); *B43K 29/004* (2013.01); *B43K 29/08* (2013.01); *B43K 29/18* (2013.01); *G06F 3/041* (2013.01); *G06F 3/04883* (2013.01); *G06F 2200/1632* (2013.01)

(58) Field of Classification Search
CPC .......... G06F 3/03545; G06F 3/046; G06F 2203/04106; G06F 3/04883; G06F 3/0488; G06F 2200/1632; H01G 5/014
See application file for complete search history.

(56) References Cited

U.S. PATENT DOCUMENTS

| | | | |
|---|---|---|---|
| 5,134,689 A * | 7/1992 | Murakami | G06F 3/046 345/177 |
| 5,631,741 A | 5/1997 | Matthews | |
| 5,633,471 A | 5/1997 | Fukushima | |
| 6,259,043 B1 | 7/2001 | Clary et al. | |

(Continued)

FOREIGN PATENT DOCUMENTS

| | | |
|---|---|---|
| EP | 0722150 A1 | 7/1996 |
| GB | 2355433 A | 10/1999 |

(Continued)

OTHER PUBLICATIONS

Extended European Search Report dated Mar. 17, 2015 in connection with European Patent Application No. 14151059.4; 14 pages.

(Continued)

*Primary Examiner* — Grant Sitta
*Assistant Examiner* — Amen Bogale

(57) ABSTRACT

An input device for an electronic device includes a circuit unit including a reactance element with a variable reactance, and a recording member configured to record on an intermediate medium and coupled with the reactance element. As a recording on the intermediate medium proceeds, writing pressure is transferred to the recording member so that the reactance of the reactance member may vary.

16 Claims, 14 Drawing Sheets

(56) References Cited

U.S. PATENT DOCUMENTS

| | | |
|---|---|---|
| 2001/0001430 A1 | 5/2001 | Ely et al. |
| 2002/0024499 A1* | 2/2002 | Karidis ................. G06F 1/1616 345/156 |
| 2004/0125089 A1* | 7/2004 | Chao ................... G06F 3/03545 345/179 |
| 2004/0140964 A1 | 7/2004 | Wang et al. |
| 2005/0057534 A1* | 3/2005 | Charlier ................ G06F 3/0312 345/179 |
| 2007/0263946 A1* | 11/2007 | Sheets .................. G06K 9/222 382/310 |
| 2008/0166175 A1 | 7/2008 | Pittel et al. |
| 2008/0250864 A1 | 10/2008 | Shipton |
| 2009/0251442 A1 | 10/2009 | Nakata |
| 2010/0207893 A1 | 8/2010 | Yeh et al. |
| 2011/0026210 A1* | 2/2011 | Tracy ................... G06F 1/1616 361/679.17 |
| 2011/0234515 A1* | 9/2011 | Kamijima ............. G06F 3/0481 345/173 |
| 2013/0113754 A1 | 5/2013 | Lee |
| 2013/0269446 A1* | 10/2013 | Fukushima .......... G01B 5/0004 73/818 |
| 2014/0069532 A1* | 3/2014 | Obata .................... G06F 3/046 137/554 |

FOREIGN PATENT DOCUMENTS

| | | |
|---|---|---|
| JP | 4119174 | 7/2008 |
| KR | 10-2011-0013939 | 2/2011 |
| KR | 10-2012-0082996 | 7/2012 |
| KR | 10-20120082995 | 7/2012 |
| WO | WO 00/33244 | 6/2000 |
| WO | WO 2008/124866 A1 | 10/2008 |

OTHER PUBLICATIONS

Partial European Search Report dated Oct. 30, 2014 in connection with European Patent Application No. 14151059.4; 6 pages.

* cited by examiner

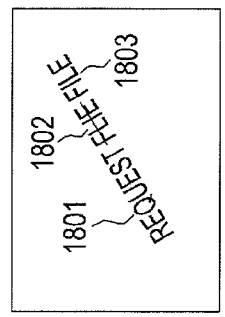
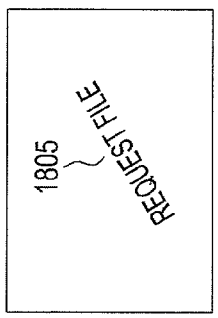
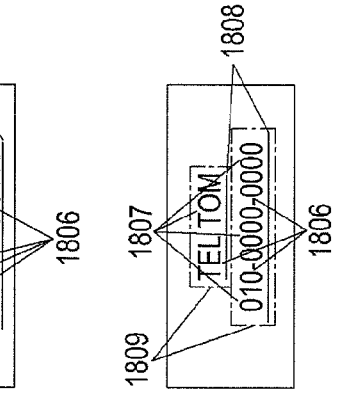
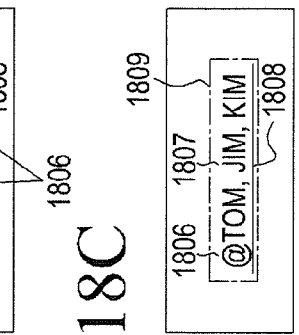
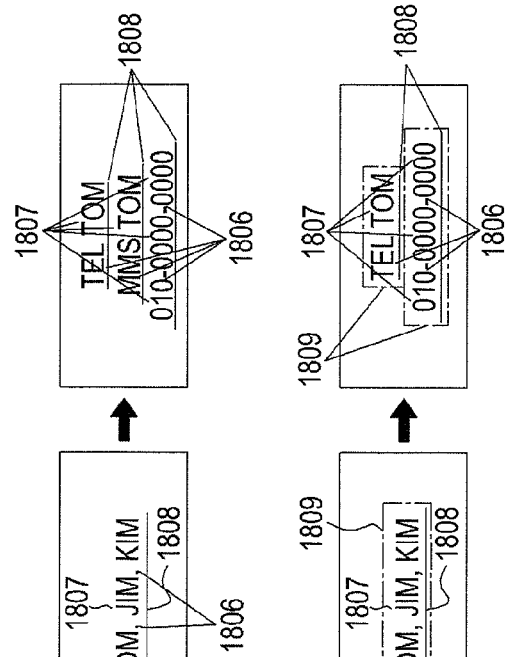
FIG.18A
FIG.18B
FIG.18C
FIG.18D

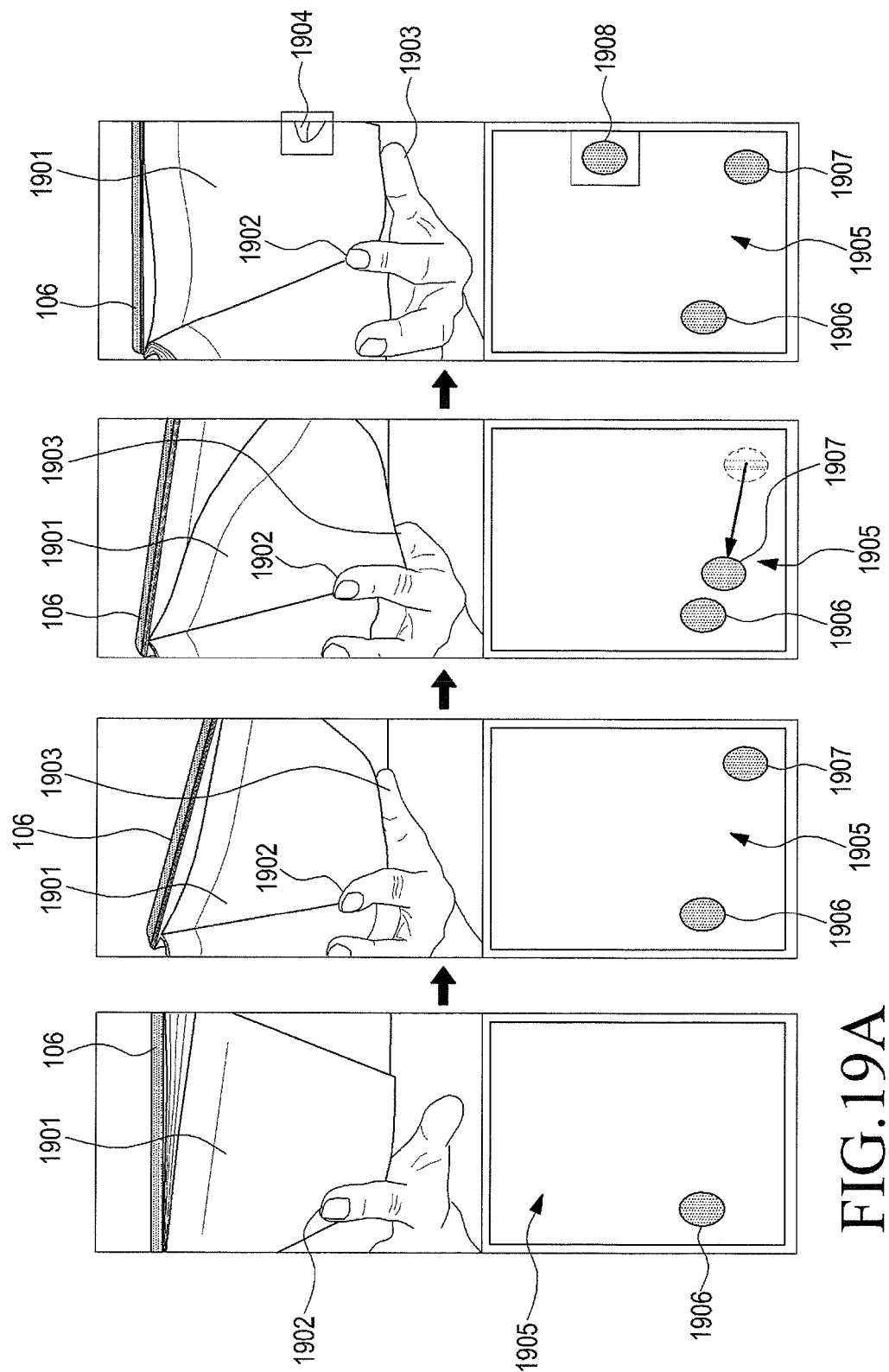

INPUT DEVICE FOR ELECTRONIC DEVICE AND INPUT METHOD USING THE SAME

CROSS-REFERENCE TO RELATED APPLICATION(S) AND CLAIM OF PRIORITY

The present application is related to and claims the priority under 35 U.S.C. §119(a) to Korean Application Serial No. 10-2013-0082238, which was filed in the Korean Intellectual Property Office on Jul. 12, 2013, the entire content of which is hereby incorporated by reference.

TECHNICAL FIELD

The present disclosure relates to an electronic device, for example, an input device for an electronic device.

BACKGROUND

Typically, an electronic device means a device such as a home appliance, an electronic scheduler, a portable multimedia player, a mobile communication terminal, a tablet PC, an image/sound equipment, a desktop/laptop computer, or a vehicle navigation system that executes a specific function according to an installed program or stored information. For example, such an electronic device outputs information stored therein as a sound or an image. There are various types of such electronic devices. For example, a desktop computer or the like is provided with an input device such as a keyboard or a mouse, and a home appliance is occasionally provided with a remote controller. In an electronic device such as a mobile communication terminal, a microphone and a keypad have been used as traditional input devices, and recently, physical keypads are superseded by touch screens.

A touch screen not only functions as a display unit of an electronic apparatus which displays a screen but also functions as an input module that receives input data by sensing a user's touch. The touch screen may detect the touch of the user's body, for example, a finger, through a touch panel which is implemented in an electrostatic capacitive type or a resistive film type.

In addition to detecting a touch through the touch screen, the user's writing may be converted into an image or a document which may be stored. In order to store the user's writing as an image or a document, a display of the electronic device, for example, the touch screen, may be activated so that the contents input by the user may be confirmed.

In order to keep the contents written by the user on an intermediate medium such as paper, the intermediate medium may be kept separately. The user may scan or image the written contents as needed to store the contents in the electronic device.

SUMMARY

The present disclosure is to provide an input device which supports handwriting which enables writing input through an embodiment and an input method using the same.

Also, the present disclosure is to provide an input device which is capable of being used for writing on an intermediate medium such as paper and enable the contents written on the intermediate medium to be stored in an electronic device through various embodiments.

According to an aspect of the present disclosure, there is provided an input device for an electronic device. The input device includes a circuit unit including a reactance element with a variable reactance, and a recording member configured to record on an intermediate medium and coupled with the reactance element. As a recording on the intermediate medium proceeds, a writing pressure is transferred to the recording member so that the reactance of the reactance member may vary.

According to another aspect of the present disclosure, there is provide an input method of an electronic device. The input method includes determining whether the electronic device is in an intermediate medium recording mode in which writing on an intermediate medium is enabled through an input device; determining whether the input device starts writing; activating a writing mode of the electronic device when the input device starts the writing; detecting an input through the writing of the input device; and executing at least one function pre-set in the electronic device according to the detected input.

According to still another aspect of the present disclosure, there is provided a computer program product including a non-transitory computer-readable recording medium encoded with computer-executable instructions that when executed cause a controller to perform the input method using the electronic device as disclosed above.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the tetra "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure, reference is now made to the following description taken in conjunction with the accompanying drawings, in which like reference numerals represent like parts:

FIGS. 18A through 18D illustrate an example of processing a writing input in an electronic device according to an embodiment of the present disclosure; and FIG. 19A through 19D illustrate an example of recognizing an operation of turning the pages of an intermediate device in an electronic device according to an embodiment of the present disclosure.

DETAILED DESCRIPTION

FIGS. 1 through 19D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, various example embodiments of the present disclosure will be described in detail with reference to accompanying drawings. In the following detailed description of various embodiments of the present disclosure, a detailed description of related known functions and configurations will be omitted when it may make the subject matter of the present disclosure rather unclear. In addition, the terms used herein are defined in consideration of functions in the specific embodiments and may be replaced by other terms according to the intents of a user or an operator or a practice. Accordingly, such terms will be more clearly defined according to the descriptions of various embodiments of the present disclosure. Further, ordinal numbers such as first and second are used in describing various embodiments merely to differentiate objects having the same name and the sequence of the objects may be determined arbitrarily.

An input device for an electronic device according to an embodiment of the present disclosure may include a resonance circuit unit implemented by reactance-variable reactance elements which include an induction coil and a capacitance-variable reactance element, and a recording member which enables recording on an intermediate medium. In addition, an input device for an electronic device according to an embodiment of the present disclosure may include a connection member fixed to the recording member so that the recording member may be coupled to the reactance elements. For example, when a user performs writing on an intermediate medium such as paper using the input device, the writing pressure produced by the contact between the recording member and the intermediate medium is transferred through the connection member so that the reactance of the reactance elements may be varied. That is, the coupling of the recording medium and the reactance elements may be achieved using the connection member. The resonance circuit unit may generate a resonance frequency and an electromagnetic field according to the variation of the reactance. The input device enables handwriting on the intermediate medium and is capable of generating an electrical signal. Accordingly, the input device not only enables writing on an intermediate medium but also enables selection or operation of icons or the like implemented on a screen or input of information through, for example, a touch screen or a digitizer.

Figure 1:
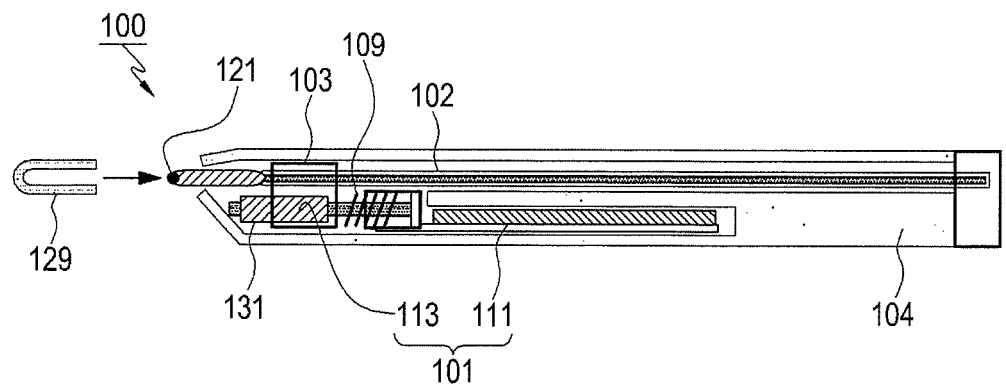
FIG. 1 is a view illustrating a configuration of an input device according to an embodiment of the present disclosure.
Figure 2:
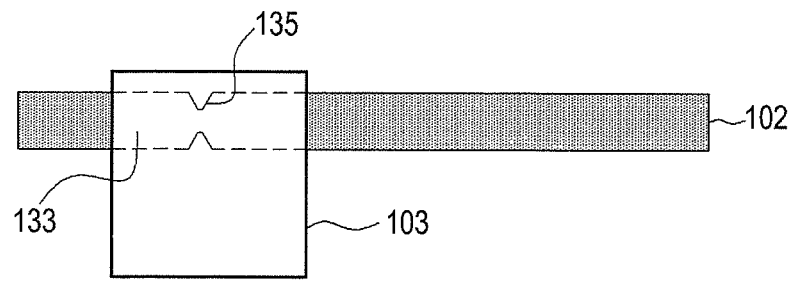
FIG. 2 is a view illustrating a part of the input device according to an embodiment of the present disclosure in an enlarged scale.

FIG. 1 is a configuration view illustrating an input device 100 according to an embodiment of the present disclosure and FIG. 2 is a view illustrating a part of the input device 100 in an enlarged scale. In addition, FIG. 3 is a view illustrating a circuit unit 101 of the input device 100.

Figure 3:
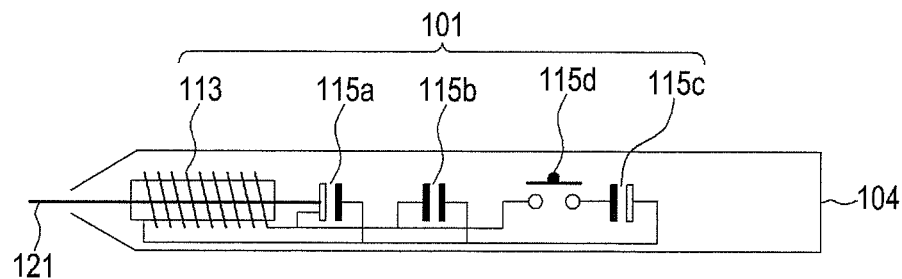
FIG. 3 is a view illustrating a resonant circuit unit of an input device according to an embodiment of the present disclosure.

Referring to FIGS. 1 to 3, the input device 100 may include a circuit unit 101 including a reactance-variable reactance element 115a, and a recording member 102 which enables writing on an intermediate medium. In an embodiment, the input device 100 may be provided with a connection member 103 fixed to the recording member 102. The reactance element 115a may include, for example, a capacitance-variable capacitive element. In an embodiment, the circuit unit 101 may be provided with an induction coil 113 connected to the reactance element 115a so as to configure a resonance circuit unit. The induction coil 113 may be a coil wound around an outer circumferential surface of a movable member 131, for example, a ferrite core, disposed within the input device 100. The reactance element 115a is interlocked with the connection member 103 and, when writing, the connection member 103 transfers the writing pressure to the reactance element 115a so that the reactance of the reactance element 115a may be varied.

The input device 100 may further include a body 104 that accommodates the circuit unit 101, the recording member 102, and the connection member 103. A circuit board 111 may be accommodated in the inside of the body 104 in which at least a part of the circuit unit 101, for example, the reactance element 115a, may be disposed on the circuit board 111.

The induction coil 113 forms an inductance current by an external power or electromagnetic field and the input device 100 may form a secondary electromagnetic field by the circuit unit 101 configured by the reactance-variable reactance element 115a and the induction coil 113. The input device 100 may further include second and third reactance elements 115b and 115c disposed on the circuit board 111. The second and third reactance elements 115b and 115c may also be connected with the induction coil 113 so as to strengthen the resonance frequency of the circuit unit 101, for example, the secondary electromagnetic field.

In an embodiment, the reactance element 115a having a variable reactance may be a variable capacitor having a variable capacitive reactance or a variable inductor of which the inductive reactance is variable. In another embodiment, the second and third reactance elements 115b and 115c may be a capacitor having a capacitive reactance or an inductor having an inductive reactance.

In an embodiment, when one of the second and third reactance elements 115b and 115c is connected to the induction coil 113, a switch member 115d may be used. The switch member 115d is operated by the user. At the moment when the switch member 115d is operated, the resonance frequency of the circuit unit 101 may be temporarily varied. Through such a temporary variation of the resonance frequency, a click operation may be implemented.

The recording member 102 enables writing on an intermediate medium including paper and may be a writing member that includes, for example, a ball point pen or a pencil. Although it is possible to write on the intermediate medium using the input device 100, it is also possible to directly manipulate an input panel such as a touch screen or a digitizer. When the recording member 102 is directly contacted with the input panel, the input panel may be damaged due to, for example, writing traces or scratches. The input device according to an embodiment of the present disclosure may further include a tip member 129 detachably provided on the end 121 of the recording member 102. The tip member 129 may be coupled to wrap the end 121 of the recording member 102, for example, a portion that executes writing. Accordingly, when directly operating the input panel rather than the intermediate medium using the input device 100, the physical damage of the input panel can be prevented by coupling the tip member 129 to the recording member 102.

In an embodiment, the input device 100 may be provided with an elastic member 109 so as to maintain the end 121 of the recording member 102 in a state where it protrudes from the body 104. Referring to FIG. 1, the elastic member 109 is exemplified as a structure that compresses the movable member 131, and the recording member 102 may be connected to the movable member 131 through the connection member 103. Accordingly, the end 121 of the recording member 102 may be maintained in the state of protruding from the body 104 by being provided with the elastic force of the elastic member 109.

The connection member 103 may be engaged to at least partially wrap the recording member 102. In an embodiment, the recording member 102 may be coupled to penetrate the connection member 103, as illustrated in FIG. 2. In order to couple the recording member 102, the connection member 103 may be formed with a through-hole 133. In addition, in an embodiment, a fastening protrusion 135 may be formed on the inner circumferential surface of the through-hole 133. When the recording member 102 is coupled to the through-hole 133, the fastening protrusion 135 is engaged with the outer circumferential surface of the recording member 102 so that the connection member 103 may be fixed to the recording member 102. During an ordinary writing action, when the fastening protrusion 135 is maintained in the state in which it is engaged with the recording member 102, the connection member 103 may be maintained in the state in which it is fixed to the recording member 102.

In an embodiment, the recording member 102 may correspond to a consumable part such as a ball point pen or a pencil. Accordingly, after being used for a predetermined period, the recording member 102 may be replaced by another recording member. At this time, the user may forcibly separate the recording member 102 from the connection member 103. For example, the fastening protrusion 135 may provide a sufficient holding force against an ordinary writing pressure so that the connection member 103 and the recording member 102 are maintained in the fixed state. However, the user may forcibly separate the recording member 102 from the connection member 103.

The recording member 102 may be accommodated in the body 104 to be movable in the longitudinal direction. Accordingly, when performing writing using the input device 100, the recording member 102 may be moved in the direction in which it is accommodated in the inside of the body 104. When the connection member 103 is fixed to the recording member 102, the writing pressure generated when writing, for example, the movement of the recording member 102 may be transferred through the connection member 103. Through this, the connection member 103 may directly transfer the writing pressure to the reactance-variable reactance element 115a.

In an embodiment, as illustrated in FIG. 1, the movable member 131 may be fixed to the connection member 103 and the movable member 131 may be connected to the reactance element 115a. Thus, the writing pressure generated from the recording member 102 may change the capacitance of the reactance element 115a through the connection member 103 and the movable member 131. In an embodiment, the induction coil 113 may be wound around the outer circumferential surface of the movable member 131. In addition, the elastic member 109 may be disposed in the inside of the body 104 so as to provide an elastic force to cause the end 121 of the recording member 102 to protrude to the outside of the body 104 as mentioned above.

Figure 4:
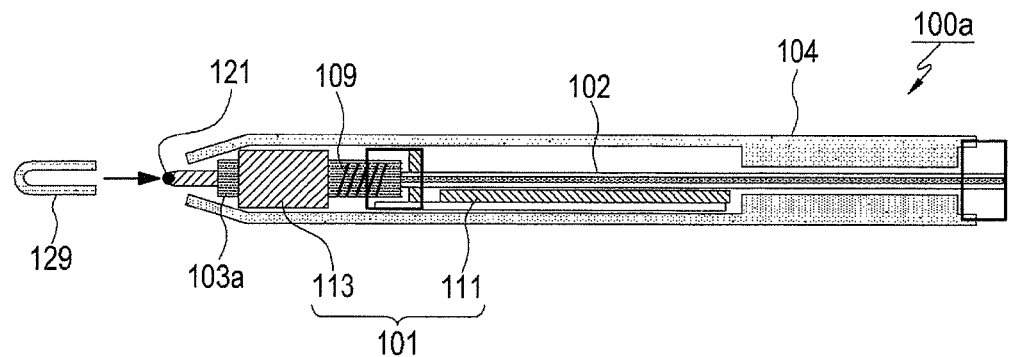
FIG. 4 is a view illustrating a configuration of an input device according to another embodiment of the present disclosure.

FIG. 4 is a configuration view illustrating an input device 100a according to another embodiment of the present disclosure.

The input device 100a illustrated in FIG. 4 is different from the input device 100 illustrated in FIG. 1 in that the induction coil 113 is disposed on the outer circumferential surface of the recording member 102. Accordingly, when describing the input device 100a illustrated in FIG. 4, for a construction which may be easily understood through the input device 100 illustrated in FIG. 1, the same reference numeral may be assigned or omitted and the detailed description thereof may be omitted.

The input device 100a may be provided with a ferrite core 103a as a connection member coupled to wrap the recording member 102. The ferrite core 103a may also be provided with the through-hole and the fastening protrusion so that the ferrite core 103a may be fastened and fixed to the recording member 102 in a state in which the ferrite core 103a wraps the outer circumferential surface of the recording member 102. The induction coil 113 may be provided in the form in which it is wound around the outer circumferential surface of the ferrite core 103a. The writing pressure generated from the recording member 102 may be transferred through a connection member, for example, the ferrite core 103a, thereby changing the reactance of the reactance-variable reactance element 115a.

In an embodiment, an elastic member 109 may be provided inside the body 104 of the input device 100a. The elastic member 109 may be supported by a structure inside the body 104 and the recording member 102 or the ferrite core 103a or the induction coil 113 fixed to the recording member 102 to compress the recording member 102. As it is compressed by the elastic member 109, the recording member 102 may be maintained in the state in which its end 121 protrudes from the body 104. The input device 100a may be provided with the tip member 129 coupled to wrap the end 121 of the recording member 102. Thus, when the input panel such as a touch screen or a digitizer is directly operated using the input device 100a, physical damage to the input panel may be prevented.

Figure 5:
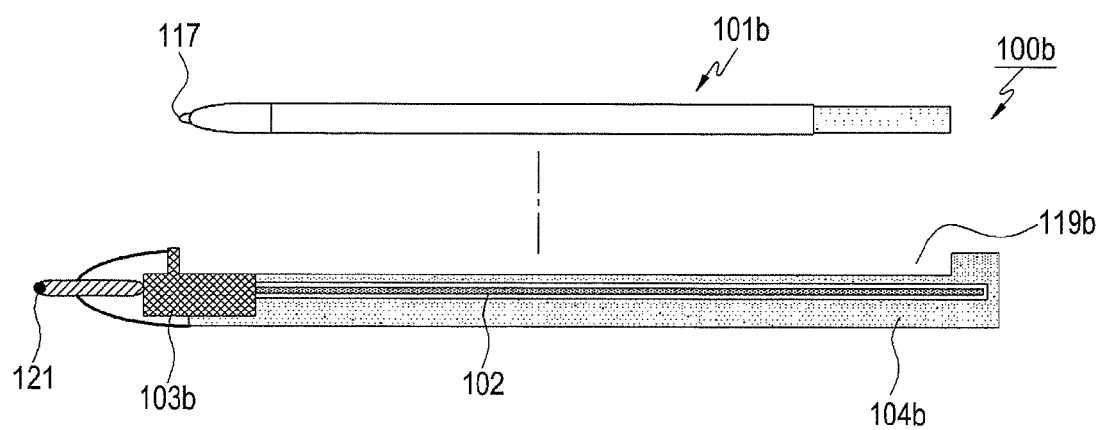
FIG. 5 is a view illustrating a configuration of an input device according to still another embodiment of the present disclosure in a state where the stylus body is separated from the writing tool body.
Figure 6:
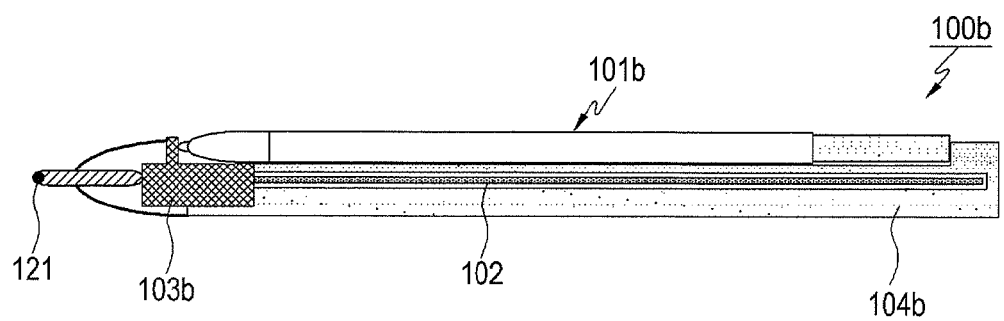
FIG. 6 is a view illustrating an input device according to still another embodiment of the present disclosure in the state where the stylus body and the writing tool body are engaged with each other.

FIG. 5 is a view illustrating a configuration of an input device 100b according to still another embodiment of the present disclosure, and FIG. 6 is another view illustrating the input device 100b. The input device 100b illustrated in FIGS. 5 and 6 includes a stylus pen that generates an electrical signal by electromagnetic resonance and a recording member that enables writing separately in which the stylus pen may be engaged with the recording member as needed. In describing the input device 100b illustrated in FIGS. 5 and 6, it is noted that for the components which may be easily understood through the previous embodiments, the same reference numerals may be assigned or omitted, and the descriptions thereof may be omitted.

The body of the stylus pen (hereinafter, referred to as a "stylus body 101b") may accommodate a circuit unit 101 which is configured by, for example, an induction coil and a reactance-variable reactance element 115a. In addition, a tip 117 may be provided on the end of the stylus body 101b to transfer a writing pressure to the circuit unit 101, for example, the reactance element 115a. Since the writing pressure is transferred from the tip 117, the capacitance of the reactance element 115a may be varied when writing is performed.

The recording member 102 may be movably accommodated in a separate writing tool body 104b. In an embodiment, an elastic member may be accommodated in the writing tool body 104b so as to compress the recording member 102 such that the end 121 of the recording member 102 protrudes from the end of the writing tool body 104. A connection member 103b may be disposed in the writing tool body 104b. The connection member 103b may be fixed to the recording member 102 so that it may be moved within the writing tool body 104b together with the recording member 102.

In an embodiment, an accommodation recess 119b may be formed on a side surface of the writing tool body 104b to accommodate the stylus body 101b. The stylus body 101b is configured to be detachable from the writing tool body 104b. A part of the connection member 103b may be exposed above the accommodation recess 119b and when the stylus body 101b is accommodated in the accommodation recess 119b, the tip 117 may be maintained in a state where it is in contact with the connection member 103b. Accordingly, when performing writing using the input device 100b accommodated in the accommodation recess 119b, the writing pressure generated by the recording member 102 may be transferred to the tip 117 through the connection member 103b. The tip 177 transfers the writing pressure again so that the reactance of the reactance element 115a accommodated in the stylus body 101b may be varied.

Figure 7:
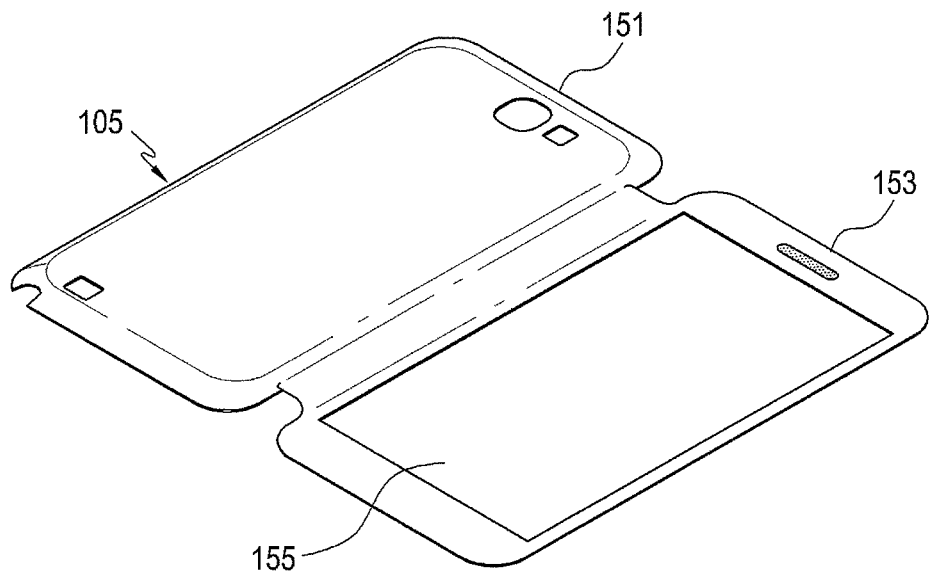
FIG. 7 is a view illustrating an auxiliary device which may be combined with an input device according to an embodiment of the present disclosure.
Figure 7:
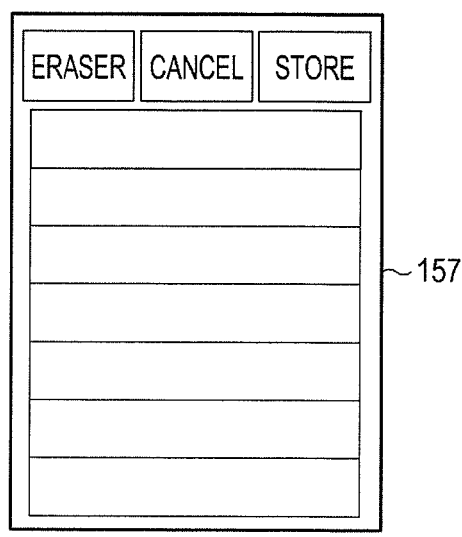
Figure 8:
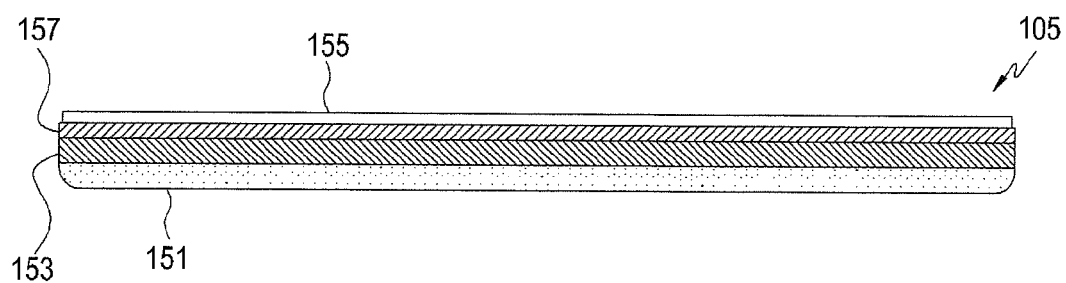
FIG. 8 is a side view illustrating an auxiliary device which may be combined with an input device according to an embodiment of the present disclosure.

FIG. 7 is a view illustrating an accessory device which may be combined with the input devices 100, 100a and 100b according to an embodiment of the present disclosure and FIG. 8 is a side view illustrating the accessory device which may be combined with the input devices 100, 100a and 100b. The above-described input devices 100, 100a, 100b may be used for writing on an intermediate medium, for example, paper or a diary. The accessory device illustrated in FIG. 7 is a protection cover 105 detachably provided to an electronic device. The protection cover 105 may be provided with an engagement part 151 which is engaged with and wraps the rear surface of the electronic device and a cover part 153 pivotally connected to the engagement part 151. When an electronic device, for example, a portable device such as a mobile communication terminal, is engaged with the engagement part 151, the cover part 153 may open or close the front surface of the electronic device. When the electronic device is equipped with a display device, for example, a touch screen, the touch screen may be opened or closed using the cover part 153.

In order to enable writing using the input devices 100, 100a, 100b, the protection cover 105 may be provided with a diary or a diary paper as an intermediate medium. The diary may be made up of diary paper 157 and a diary cover 155. The diary paper 157 is attached to an outer surface of the cover part 153 and may be opened or closed by the diary cover 155. Accordingly, the user may write on the diary paper 157 using one of the input devices 100, 100a, and 100b even in a state in which the electronic device engaged with the protection cover 105 is closed by the cover part 153. When a secondary electromagnetic field, a moving trace, or the like generated by the input devices 100, 100a, and 100b is detected, the electronic device may store the contents written on the diary paper 157 as a digitalized image or document even in a state where the cover part 153 is closed by the electronic device. When the electronic device stores the written contents as a digitalized file in the closed state, the display device or the like may be un-activated. However, functions for detecting the movement of the input devices 100, 100a, and 100b, for example, the written contents, may be activated. Such an input or control method will be described in more detail in FIGS. 11 to 18D.

Figure 9:
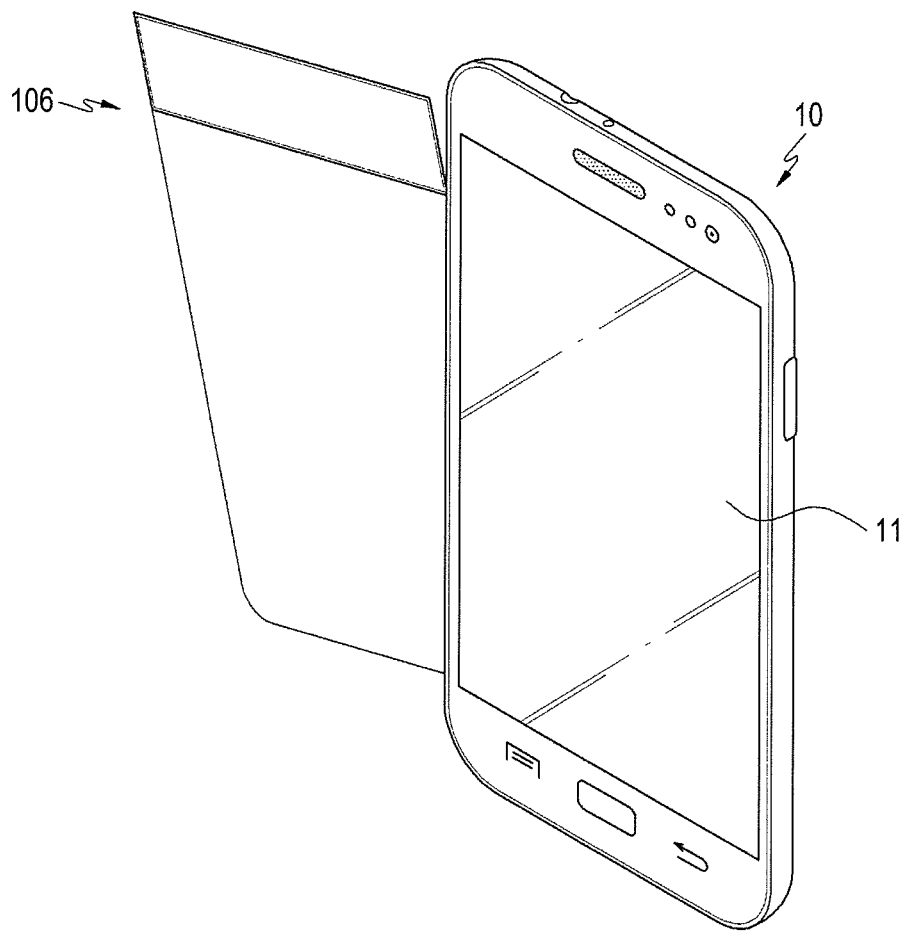
FIG. 9 is a view illustrating a configuration of an electronic device which may be combined with an input device according to an embodiment of the present disclosure.
Figure 10:
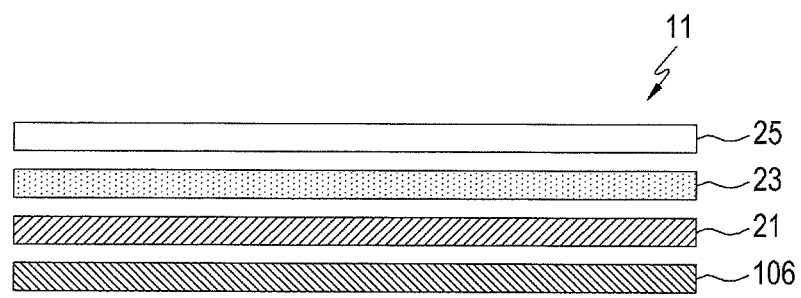
FIG. 10 is a cross-sectional view illustrating an electronic device which may be combined with an input device according to an embodiment of the present disclosure.

FIG. 9 is a schematic perspective view illustrating an electronic device 10 which may be combined with any of the input devices 100, 100a, and 100b according to an embodiment of the present disclosure, and FIG. 10 is a cross-sectional view illustrating an electronic device which may be combined with any of the input devices 100, 100a, and 100b according to another embodiment of the present disclosure. The electronic device 10 itself may not be provided with an input panel which is capable of detecting the movement of an input device 100, 100a, or 100b, for example, the user's writing contents. In addition, when a touch screen function or a digitizer is integrated in the display device 11 of the electronic device 10, the electronic device 10 may detect the contents written using the input device 100, 100a, or 100b through the display device 11 itself and store the detected contents.

Referring to FIG. 9 first, the electronic device 10 is provided with a display device 11 on the front side thereof. In order to detect the contents written by the input device 100, 100a, or 100b, the electronic device 10 may be provided with a separate digitizer 106 as an input panel. The digitizer 106 may detect the contents written using the input device 100, 100a, or 100b and transfer the written contents to the electronic device 10 while conducting communication with the electronic device 10 in a wired or wireless manner. The digitizer may be made up of a flexible panel that may be folded or wound to carry.

The digitizer 106 as an input panel may generate an electromagnetic field when alternating current (AC) is applied thereto. When the user moves the input device 100, 100a, or 100b closer to the digitizer 106, a secondary current may be generated in the induction coil of the input device 100, 100a, or 100b by the electromagnetic field of the digitizer 106. When the secondary current is generated by the induction coil, the input device 100, 100a, or 100b may generate a secondary electromagnetic field through the circuit unit 101. When writing is performed using the input device 100, 100a, or 100b which generates the secondary electromagnetic field, the digitizer 106 detects the moving trace of the input device 100, 100a, or 100b to convert the written contents into a digitized file. After superposing the digitizer 106 as described above onto an intermediate medium such as paper, the user may write on the intermediate medium using the input device 100, 100a, or 100b. In an embodiment, the digitizer 106 may convert the contents written on the intermediate medium into a digitized file. In addition, the digitizer 106 may transmit the digitized file to the electronic device 10 through wired or wireless communication.

As described above, the digitizer 106 may be integrated into the display device 11 of the electronic device 10. In this case, the input panel combined with the input device 100, 100a or 100b may be the display device 11 of the electronic device 10. FIG. 10 illustrates a structure of a part of the electronic device 10, for example, the display device 11 in a cross-section. The digitizer 106 is integrated in the display device 11, and thus, the display device 11 itself may operate as an input panel capable of detecting the written contents of the input device 100, 100a or 100b.

Referring to FIG. 10, a window member 25, for example, a glass member, may be disposed at the outer side of the display device 11 and a display module 21, for example, a Liquid Crystal Display (LCD) module, may be disposed on the inner side of the display device 11. When the display device 11 has a touch screen function, a touch panel 23 may be interposed between the window member 25 and the display module 21. The touch panel 23 may be made up of a transparent synthetic resin film and a plurality of transparent electrodes formed using an Indium-Tin Oxide. The display device 11 is provided with a digitizer 106 inside of the display module 21 to be capable of detect a writing input using the input device 100, 100a, or 100b.

When the digitizer 106 is integrated into the display device 11 of the electronic device 10, the protection cover 105 illustrated in FIG. 7 may be usefully used in combination with the electronic device 10. For example, the user may write on the diary paper 157 using the input device 100, 100a, or 100b, and the written contents may be stored as a file digitized through the input panel, for example, the digitizer 106 integrated into the display device 11. Accordingly, the user may provide the written diary paper 157 to another person and store the written contents on the user's electronic device. On the diary paper 157, a user interface associated with creating a simple memo may be printed. Accordingly, the user may write on an intermediate medium such as paper, for example, on the diary paper 157 and at the same time, may conveniently store the written contents as a digitized file.

The input method using input devices according to an embodiment of the present disclosure may be implemented in any electronic device provided with a display means (e.g., a touch screen), and any electronic device which is capable of displaying an image through the display means and being installed with a predetermined application that may control the displaying method of the image may be included in the electronic devices according to an embodiment of the present disclosure.

The electronic device in the present disclosure may be an arbitrary device provided with a touch screen and may be referred to as, for example, a portable terminal, a mobile terminal, a communication terminal, or a portable mobile terminal. For example, the electronic device may be, for example, a smart phone, a portable phone, a game machine, a television (TV), a display device, a vehicle head unit, a notebook computer, a laptop computer, a tablet computer, a Personal Media Player (PMP), a Personal Digital Assistants (PDA), a navigation system, an ATM of a bank, or a POS device of a store. Further, the electronic device in the present disclosure may be a flexible device or a flexible display device.

The representative configuration of such electronic devices is related to a portable terminal (e.g., a portable phone or a smart phone) and some components may be omitted or changed as needed. First, as an example of an electronic device to which the present disclosure is applied, a configuration of a portable terminal will be described with reference to FIGS. 11 to 13.

Figure 11:
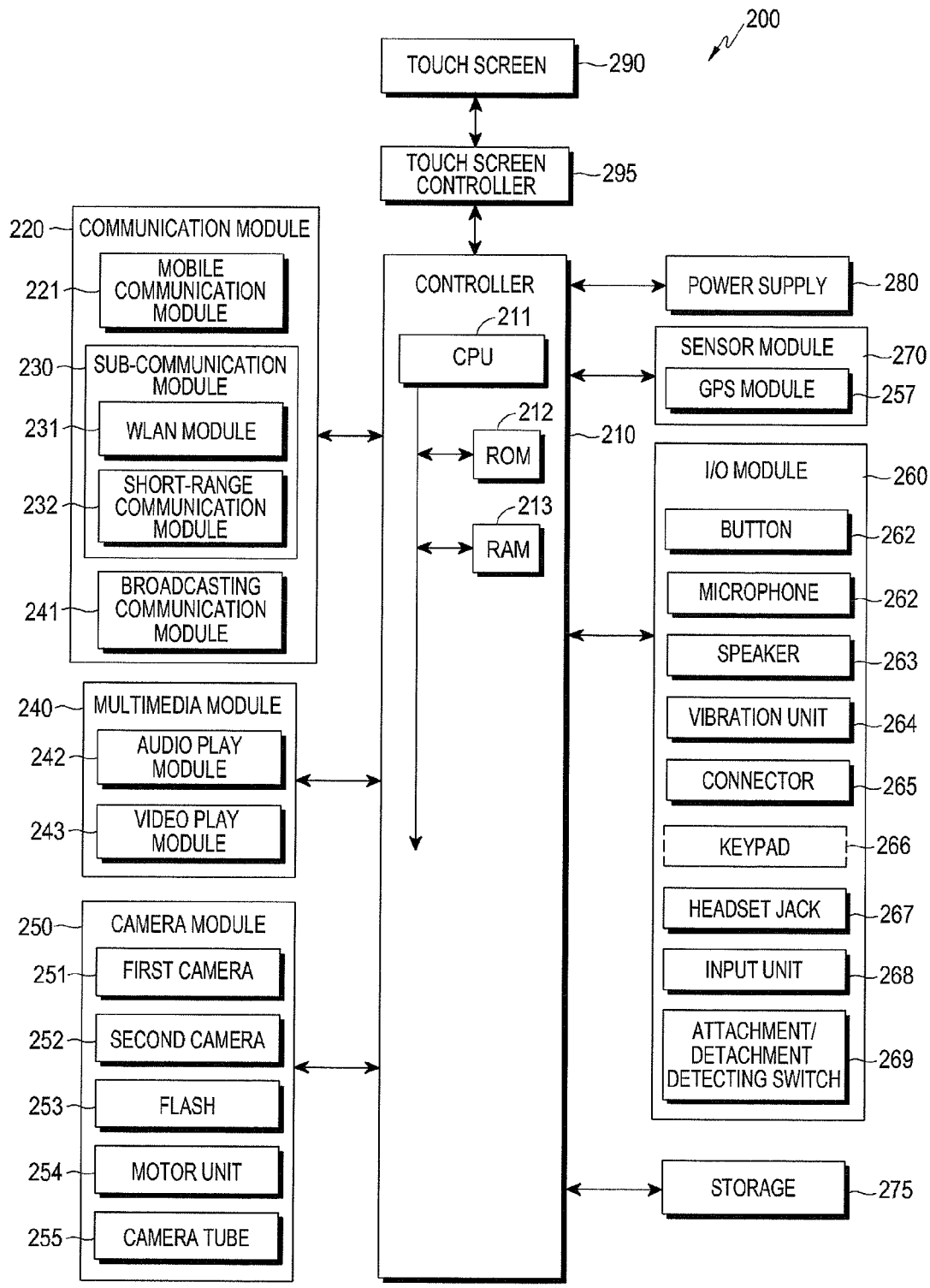
FIG. 11 is a schematic block diagram illustrating a portable terminal as an electronic device according to an embodiment of the present disclosure.

FIG. 11 is a schematic block diagram illustrating an example of a portable terminal as an electronic device of an embodiment of the present disclosure.

Referring to FIG. 11, the portable terminal 200 may be connected with an external electronic device using at least one of a communication module 220, a connector 265, or an earphone connecting jack 267. Such an electronic device may at least one of various devices such as an earphone detachably attached to the portable terminal 200 to be connected through a wire to the portable terminal 200, an external speaker, a Universal Serial Bus (USB) memory, a charger, a cradle/dock, a DMB antenna, a mobile payment related device, a healthcare device (e.g., a blood sugar level measurement device) or the like, a game machine, and a vehicle navigation system. In addition, the electronic device may include a wirelessly connectable Bluetooth communication device, a Near Field Communication (NFC) device, a WiFi Direct communication device, and a wireless Access Point (AP). In addition, the portable terminal 100 may be wiredly or wirelessly connected with another portable terminal or electronic device, for example, one of a portable phone, a smart phone, a tablet PC, a desktop PC, and a server.

Further, the portable terminal 200 may include at least one of the touch screen 290 or the digitizer 106. For example, the portable terminal may include the touch screen 290, the digitizer 106, or both the touch screen 290 and the digitizer 106. Moreover, the portable terminal may include at least one of a touch screen controller 295 or a digitizer controller.

In addition, the portable terminal 200 may include a control unit 210, a communication module 220, a multimedia module 240, a camera module 250, an input/output module 260, a sensor module 270, a storage unit 275, and a power supply unit 280. The communication module 220 may include a mobile communication module 221, a sub-communication module 230, and a broadcast communication module 241. The sub-communication module 230 may include at least one of a wireless Local Area Network (LAN) module 231 or a Short range communication module 232. The multimedia module 240 may include at least one of an audio reproducing module 242 or a moving image reproducing module 243. The camera module 250 may include at least one of a first camera 251 or a second camera 252. In addition, the input/output module 260 may include at least one of a button 261, a microphone 262, a speaker 263, a vibration element 264, a connector 265, or a keypad 266.

The control unit 210 may include a CPU 211, a ROM 212 in which a control program for controlling the portable terminal 200 is stored, and a RAM 213 which stores a signal or data input from the outside of the portable terminal 200 or is used as a storage region for a job conducted in the portable terminal 200. The CPU 211 may include a single-core, a dual-core, a triple-core or a quad-core. The CPU 211, the ROM 212 and the RAM 213 may be interconnected through an internal bus.

Also, the control unit 210 may control the communication module 220, the multimedia module 240, the camera module 250, the input/output module 260, the sensor module 270, the storage unit 275, the power supply unit 280, the touch screen 290, the touch screen controller 295, the digitizer 106, and the digitizer controller.

The control unit 210 may determine whether or not the input device 100 is separated from the portable terminal 200 according to an embodiment of the present disclosure. The detachment or attachment of the input device 100 may be determined in the following manner.

First, the control unit 210 may determine whether the input device 100 is separated from the portable terminal 200 through, for example, a tack switch or a push switch installed in an accommodation space of the input device 100.

Second, in the state in which the input device 100 is attached to the portable terminal 200, the control unit 210 may determine whether or not the input device 100 is separated from the portable terminal 200 by detecting the secondary electromagnetic field generated in the input device 100 by the electromagnetic field generated by the digitizer 106.

In addition, when the input device 100 is separated from the portable terminal 200, the control unit 210 may determine whether the cover of the portable terminal 200, for example the cover part 153, is opened or closed. The opening/closing of the cover part 153 may be in the following manner.

First, when the cover part 153 includes a magnetized portion, the variation of magnetism may be sensed through a magnetic sensor provided in the sensor module 170 of the portable terminal 200. Accordingly, the opening/closing of the cover part 153 may be determined by sensing the magnetism in the state in which the cover part 153 is closed and the magnetism in the state where the cover part 153 is opened.

Second, the variation of illumination intensity may be sensed through the sensor module 170 of the portable terminal 200. Accordingly, the opening/closing of the cover part 153 may be determined by sensing the illumination intensity in the state where the cover part 153 is closed and the illumination intensity in the state where the cover part 153 is opened.

In addition, when the input device 100 is separated from the portable terminal 200 and the cover part 153 of the portable terminal 200 is closed, the control unit 210 may switch the portable terminal 200 into a writing mode. At this time, the screen of the portable terminal 200 may not be activated. For example, the light emitting elements of the portable terminal 200 may not emit light. The user may perform writing input on the input panel, for example, the digitizer 106 or an intermediate medium disposed on the digitizer 106 using the input device 100 in the state where the cover of the portable terminal 200 is closed.

In addition, the user may write on the top surface of the input panel and an intermediate medium positioned on the top surface of the input panel. The control unit 210 may detect the writing-input of the input device by detecting the secondary electromagnetic field even if the intermediate medium, for example, the diary paper 157, exists between the input panel and the input device 100 within a range where the writing-input of the input device 100 may be detected.

Further, when the user turns over pages of the intermediate medium of the paper, the control unit 210 may recognize the page turn-over, store the contents written until that time, and generate a new writing mode. The recognition of the page turn-over will be described in detail below with reference to FIGS. 18A through 18D.

Also, the control unit 210 may search whether at least one pre-set function mapped with the detected writing input exists in the portable terminal 200, and as a result of then search, when at least one function mapped with the detected writing input exists, the control unit 210 may execute the corresponding function. The execution of at least one function mapped with a detected writing input will be described in detail below with reference to FIG. 17.

The inputs according to various embodiments of the present disclosure may include, for example, a gesture input using the camera module 150, a switch/button input through the button 161 or the keypad 166, and a voice input through the microphone 162, besides the user input through the touch screen 190 or the digitizer 106.

Further, the control unit 210 may sense a user input event such as a hovering event according to the approach of the input device 100 to or the positioning of the input device 100 closer to the touch screen 190 or the digitizer (not illustrated). The determination of the start of the writing may be made based on the hovering event which senses the approach of the input device 100 to the digitizer.

In addition, the control unit 210 may detect various user inputs received not only through the touch screen 290 but also through, for example, the camera module 250, input/output module 260, and sensor module 270. The user inputs may include not only the touch but also various types of information input to the portable terminal 100, such as the user's gestures, the user's voice, the movement of the user's pupils, the user's iris recognition, and a bio-signal. The control unit 210 may conduct a control such that a predetermined action or function corresponding to a detected user's input may be executed in the portable terminal 200.

Further, the control unit 210 may output a control signal to the input unit 268 or the vibration element 264. Such a control signal may include information related to a vibration pattern and the input unit 268 or the vibration element 264 generates vibration according to the vibration pattern. The information related to the vibration pattern may indicate, for example, the vibration pattern itself and an identifier of the vibration pattern. In one embodiment, the control signal may merely include a request for vibration generation.

Depending on performances, the portable terminal 200 may include at least one of the mobile communication module 221, the wireless LAN module 231, or the short range communication module 232.

The mobile communication module 221 may allow the portable terminal 200 to be connected with an external electronic device through mobile communication using one or more antennas according to the control of the control unit 210. The mobile communication module 221 may conduct a voice communication, an image communication, or transmission/reception of wireless signals for a text message (SMS) or multimedia message (MMS) with a portable phone, a smart phone, a tablet PC, or any other electronic device that has a phone number input to the portable terminal 200.

The sub-communication module 230 may include at least one of the wireless LAN module 231 or the short range communication module 232. For example, the sub-communication module may include the wireless LAN module 231, the short range communication module 232, or both the wireless LAN module 231 and the short range communication module 232.

The wireless LAN module 231 may be connected to the Internet at a place where a wireless AP is installed according to the control of the control unit 210. The wireless LAN module 231 may support the wireless LAN standard (IEEE 802.11x) of the Institute of Electrical and Electronics Engineers (IEEE). The short range communication module 232 may conduct short range communication between the portable terminal 200 and an external electronic device according to the control of the control unit 210. The short range communication methods may include, for example, Bluetooth, Infrared Data Association (IrDA), WiFi-Direct communication, and NFC (Near Field Communication).

The broadcast communication module 241 may receive a broadcast signal broadcasted from a broadcast station through a broadcast antenna (e.g., a TV broadcast signal, a radio broadcast signal, or a data broadcast signal) and another broadcast information (e.g., Electric Program Guide (EPG) or Electric Service Guide (ESG)) according to the control of the control unit 210.

The multimedia module 240 may include the audio reproducing module 242 or the moving image reproducing module 243. The audio reproducing module 242 may reproduce a digital audio file (e.g., a file of which the file extension is mp3, wma, ogg, or way) stored in the storage unit 275 or received according to the control of the control unit 210. The moving image reproducing module 243 may reproduce a stored or received digital moving image file (e.g., a file of which the file extension is mpeg, mpg, mp4, avi, mov, or mkv) according to the control of the control unit 210. The multimedia module 240 may be integrated into the control unit 210.

The camera module 250 may include at least one of a first camera 251 or a second camera 252 which photograph a still image or a moving image according to the control of the control unit 210.

In addition, the camera module 250 may include at least one of a lens barrel unit 255 that conducts zoom-in/zoom-out in order to photograph a subject, a motor unit 254 that controls the movement of the lens barrel unit 255, or a flash 253 that provides an auxiliary light source associated with photographing a subject. The first camera 251 may be disposed on the front side of the portable terminal 200 and the second camera 252 may be disposed on the rear side of the portable terminal 100.

The input/output module 260 may include at least one button 261, at least one microphone 262, at least one speaker 263, at least one vibration element 264, a connector 265, a keypad 266, an earphone connecting jack 267, or an input device 100. In addition, the input/output module 260 is not limited to this and may be provided with a cursor control such as a mouse, a track ball, a joystick, or cursor direction keys so as to control the movement of a cursor on the touch screen 290.

The buttons 261 may be formed on the front surface, a lateral surface, or a rear surface of the housing (or case) of the portable terminal 200, and may include at least one of a power/lock button, a volume button, a menu button, a home button, a return button back button, or a retrieval button.

The microphone 262 may generate an electrical signal by receiving an input of voice or sound according to the control unit 210.

The speaker 263 may output sounds corresponding to various signals or data (e.g., wireless data, broadcast data, digital audio data, and digital moving image data) to the outside of the portable terminal 200 according to the control of the control unit 210. The speaker 263 may output sounds corresponding to a function conducted by the portable terminal 100 (e.g., a button operation sound, a ring back tone, and a voice of the counterpart user corresponding to a phone call). One or more such speakers 263 may be formed at one or more proper positions of the housing of the portable terminal 200.

The vibration element 264 may convert an electrical signal into a mechanical vibration according to the control of the control unit 210. For example, when a voice call or an image call is received from another device when the portable terminal 200 is in the vibration mode, the vibration element 264 is operated. One or more such vibration elements 264 may be formed in the inside of the housing of the portable terminal 200. The vibration element 264 may be operated in response to the user input through the touch screen 290 or the digitizer 106.

Further, when at least one function pre-set in the portable terminal 200 or mapped with a writing input according to an embodiment of the present disclosure is executed, the vibration element 264 may be operated according to the control of the control unit 210 so as to indicate that the corresponding function is executed. For example, the control unit 210 may generate control signals of the vibration element 264 which correspond to functions to be conducted, respectively, and the vibration element 264 may differently activate, for example, the intensity of vibration and the vibration duration depending on the control signals. Accordingly, the user may discriminate the conducted function based on the conducted vibration.

The connector 265 may be used as an interface for interconnecting the portable terminal 200 and an external electronic device or a power source. The control unit 210 may transmit data stored in the storage unit 275 of the portable terminal 200 through a wire cable connected to the connector 265 to an external electronic device or receive data from the external electronic device. The portable terminal 200 may receive power from the power source through the wire cable connected to the connector 265, or charge a battery using the power source.

The keypad 266 may receive a key input from the user so as to control the portable terminal 200. The keypad 266 may include a physical keypad formed on the portable terminal 200 or a virtual keypad displayed on the touch screen 290. The physical keypad formed on the portable terminal 200 may be omitted depending on the performance or construction of the portable terminal 200.

The earphone may be inserted into an earphone connecting jack 167 to be connected to the portable terminal 200.

The input device 100 may be stored by being inserted into the inside of the portable terminal 200 and may be drawn out or separated from the portable terminal 200 when it is used. At a region in the inside of the portable terminal 200 where the input device 100 is inserted, an detachment/attachment recognizing switch 269 is provided to be operated in response to the mounting and detachment/attachment of the input device 100 and may output a signal corresponding to the mounting or separation of the input unit 268 to the control unit 210. The detachment/attachment recognizing switch 269 may be configured to be directly or indirectly contacted with the input device 100 when the input device 100 is mounted. Thus, the detachment/attachment recognizing switch 269 may generate a signal corresponding to the mounting or separation of the input device (i.e., a signal notifying the mounting or separation of the input device 100) based on whether the detachment/attachment recognizing switch 269 is contacted with the input device 100 or not and output the signal to the control unit 210.

The sensor module 270 includes at least one sensor that detects the state of the portable terminal 200. For example, the sensor module 270 may include at least one sensor among the sensors such as a proximity sensor that detects whether the user approaches the portable terminal 200 or not, an illumination sensor or an ambient light sensor that detects the amount of light around the portable terminal 200, a motion sensor that detects the action of portable terminal 200 (e.g., rotation, acceleration, or vibration of the portable terminal 200), a geo-magnetic sensor that detects the point of the compass of the portable terminal 200 using the geo-magnetic field, a gravity sensor that detects the gravity acting direction, an altimeter that detects an altitude by measuring an atmospheric pressure, a GPS module 257, and a magnetic sensor that detects a change of magnetism around the portable terminal 200.

The GPS module 257 may calculate the position of the portable terminal 200 by receiving electromagnetic waves from a plurality of GPS satellites on the earth orbit and using the time of arrival of the electromagnetic waves to the portable terminal 200 from the GPS satellites.

When the cover that covers the portable terminal 200, for example, the cover part 153, includes a magnetized portion, the magnetic sensor may detect the variation of magnetism so as to determine whether the cover part 153 covers the portable terminal 200.

The storage unit 275 may store signals or data which may be input/output according to the operation of the communication module 220, the multimedia module 240, the camera module 250, the input/output module 260, the sensor module 270, the touch screen 290, or the digitizer (not illustrated) according to the control of the control unit 210. The storage unit 275 may store control programs and applications for controlling the portable terminal 200 or the control unit 210.

The term "storage unit" may refer to an arbitrary data storage device such as the storage unit 275, the ROM 212 and RAM 213 in the control unit 210, or a memory card mounted on the portable terminal 200 (e.g., SD card or memory stick). The storage unit 275 may include a non-volatile memory, a volatile memory, a Hard Disc Drive (HDD), or a Solid State Drive (SSD).

In addition, the storage unit 275 may store images for providing applications of various functions such as navigation, image call, games, and time-based alarm applications, Graphical User Interfaces (GUIs) related to the applications to the user, databases or data related to user information, documents, touch input processing methods, background images associated with operating the portable terminal 200 (e.g., menu screen and standby screen), operation programs, and images photographed by the camera module 250.

Figure 17:
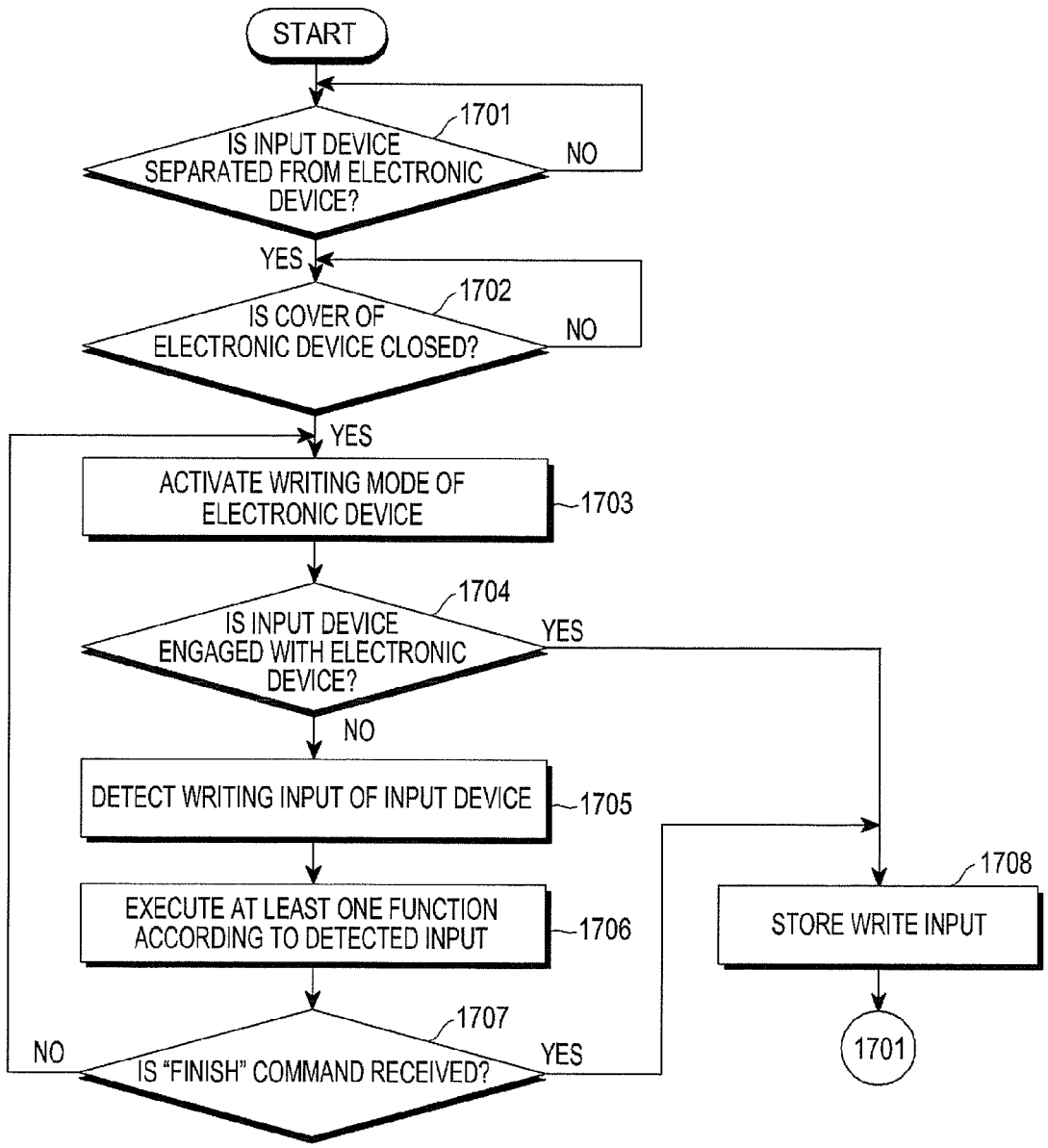
FIG. 17 is a flowchart illustrating a procedure of still another input method using an input device according to an embodiment of the present disclosure.

In addition, the storage unit 275 may store writing mode-related applications that may recognize a writing input by the input device 100 according to an embodiment of the present disclosure, and may store execution information of at least one function of the portable terminal 200, which is mapped with at least one writing input, in a table form such that the writing input and the execution information correspond to each other. According to an embodiment of the present disclosure, the execution information of the at least one function of the portable terminal 200, which is mapped with the writing input and stored in the storage unit 275, may be stored in such a manner that a plurality of function execution information items are classified into specific group units, folder units, category units or the like according to the user's setting. As illustrated in FIG. 17, the control unit 210 may recognize a text which is writing-input through the input device 100, and search the execution information of at least one function of the portable terminal 200, which is mapped with the recognized text, in the storage unit 275.

The storage unit 275 is a machine (e.g., computer) readable medium. The term, "machine readable medium" may be defined as a medium which provides data to a machine so that the machine may execute a specific function. The storage unit 275 may include a non-volatile medium and a volatile medium. All the mediums may be types which allow the commands transferred by the mediums to be detected by a physical mechanism that reads the commands by a machine.

The machine readable mediums may include, but not exclusively, at least one of a floppy disk, a flexible disk, a hard disc, a magnetic tape, a Compact Disc Read-Only Memory (CD-ROM), an optical disc, a punch card, paper tape, a RAM, a Programmable Read-Only Memory (PROM), an Erasable PROM (EPROM), a flash-EPROM, or an embedded Multi Media Card (eMMC).

The power supply unit 280 may supply power to one or more batteries disposed in the housing of the portable terminal 200 according to the control unit 210. The one or more batteries supply power to the portable terminal 200. In addition, the power supply unit 280 may supply power input from an external power source to the portable terminal 200 through a wire cable connected with the connector 265. In addition, the power supply unit 280 may supply power wirelessly input from the external power source to the portable terminal 200 through a wireless charge technology.

In addition, the portable terminal 200 may include at least one touch screen 290 which provides graphical user interfaces corresponding to various services (e.g., phone call, data transmission, broadcasting, and photographing) to the user. The touch screen 290 may output an analog signal corresponding to at least one user input which is input to the graphical user interfaces to the touch screen controller 295.

The touch screen 290 may receive at least one user input through a user's body (e.g., fingers including a thumb) or other input devices (e.g., a stylus pen and an electronic pen). The touch screen 290 may be implemented in, for example, a resistive film type, an electrostatic capacitive type, an infrared type, an acoustic wave type, or a combination thereof.

Further, the touch screen 290 may include at least two touch panels which may sense a touch or approach of a finger or other input device so that the touch panels may receive inputs by the finger and the input device, respectively. The at least two touch panels provide different output values to the touch screen controller 295, and the touch screen controller 295 differently recognizes the values input from the at least two touch panels. Thus, the touch screen controller 295 may discriminate whether an input from the touch screen 290 is an input by a finger or an input by another input device.

In addition, the touch is not limited to a contact between the touch screen 290 and the user's body or a touchable input means but may include non-contact (e.g., the detectable spacing between the touch screen 290 and the user's body or the touchable input means which is not more than 1 mm). The spacing detachable by the touch screen 290 may be changed according to the performance or structure of the portable terminal 200.

The touch screen controller 295 converts an analog signal input from the touch screen 290 into a digital signal and transmits the digital signal to the control unit 210. The control unit 210 may control the touch screen 290 using the digital signal received from the touch screen controller 295. The touch screen controller 295 may confirm not only the user's input position but also a hovering interval or distance by detecting the value output through the touch screen 290 (e.g., a current value) and convert the confirmed distance value into a digital signal (e.g., a Z-coordinate) which may be provided to the control unit 210. In addition, the touch screen controller 295 may detect the pressure compressing the touch screen 290 by the user input means by detecting the value output through the touch screen 290 (e.g., a current value) and convert the confirmed pressure value into a digital signal which may be provided to the control unit 210.

Figure 12:
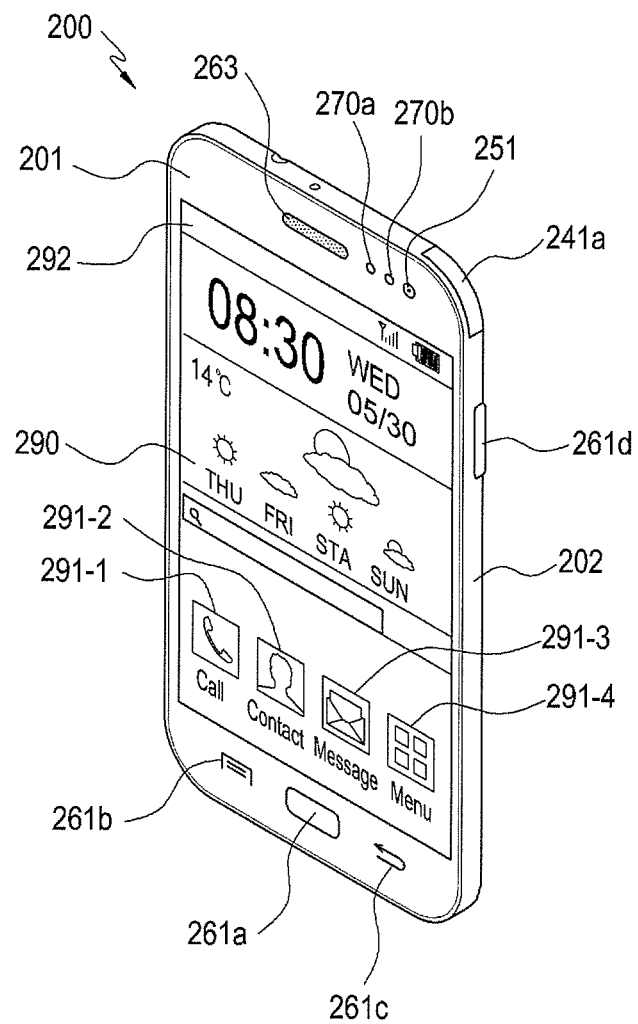
FIG. 12 is a front side perspective view illustrating a portable terminal according to an embodiment of the present disclosure.
Figure 13:
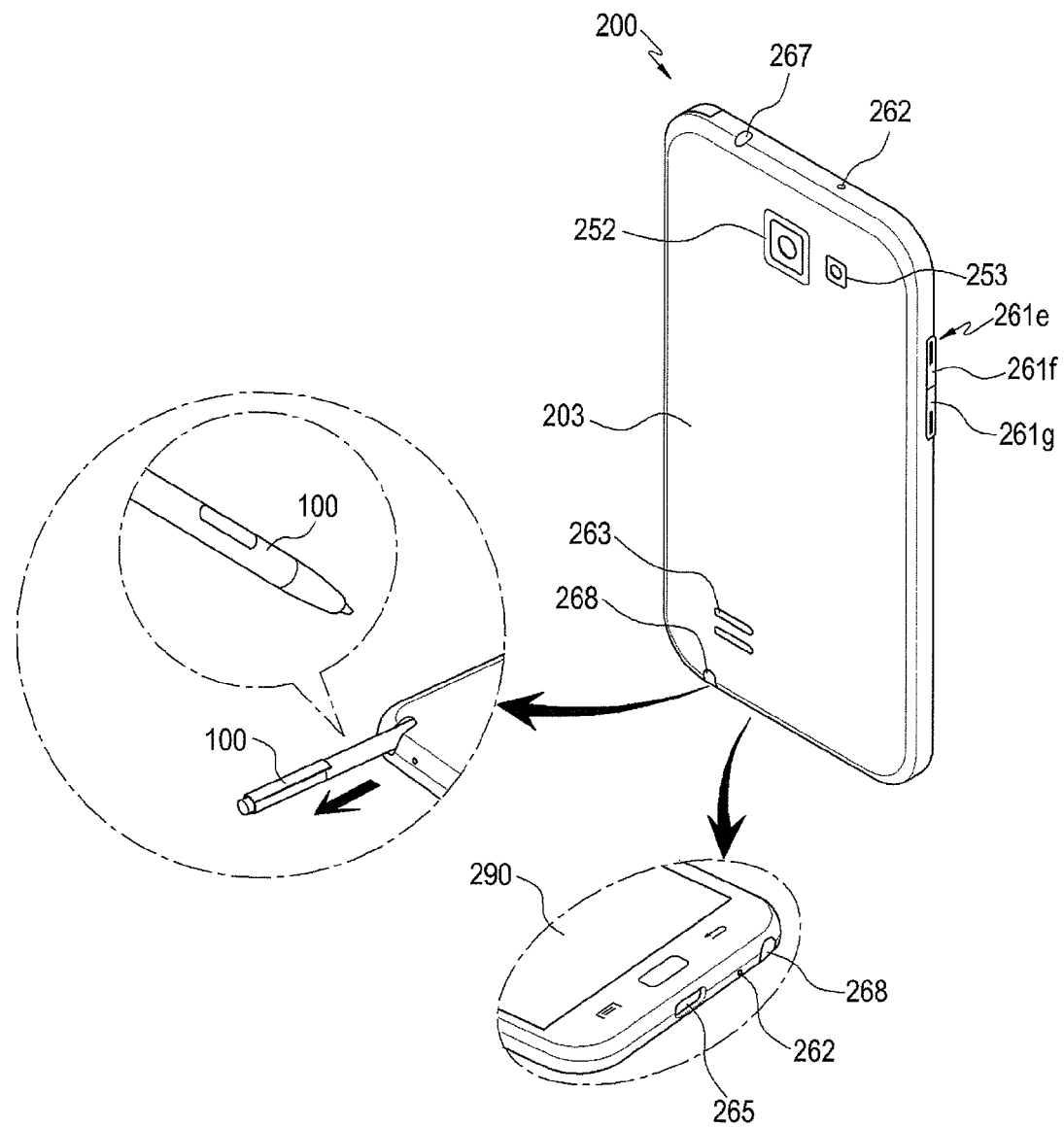
FIG. 13 is a rear side perspective view of the portable terminal according to an embodiment of the present disclosure.

FIG. 12 is a front side perspective view of a portable terminal according to an embodiment of the present disclosure, and FIG. 13 is a rear side perspective view illustrating the portable terminal shown in FIG. 12.

Referring to FIGS. 12 and 13, the touch screen 290 is disposed at the center of the front surface 201 of the portable terminal 200. The touch screen 290 may be formed in a large size to occupy a great part of the front surface 201 of the portable terminal 200. FIG. 12 illustrates an example in which a main home screen is displayed on the touch screen 290. The main home screen is the first screen displayed on the touch screen 290 when the power of the portable terminal 200 is turned ON. In addition, when the portable terminal 200 includes plural pages of different home screens, the main home screen may be the first home screen among the plural pages of home screens. On the main home screen, for example, shortcut icons 291-1, 291-2, and 291-3 for executing frequently used applications, a main menu key 291-4, time, and weather may be displayed. When the user selects the main menu key 291-4, a menu screen is displayed on the touch screen 290. In addition, at the top end of the touch screen 290, a status bar 292 may be formed which may display the status of the portable terminal 200 such as the battery charge state, the intensity of received signals, and current time.

On the lower portion of the touch screen 290, a home button 261a, a menu button 261b, and a back button 261c may be formed. The home button 261a displays the main home screen on the touch screen 290. For example, when the home button 261a is selected in a state in which the main home screen and any other home screen or the menu screen are displayed on the touch screen 290, the main home screen may be displayed on the touch screen 290. In addition, the button 261a is selected while applications are being executed on the touch screen 290, the main home screen illustrated in FIG. 2 may be displayed on the touch screen 290. Also, the home button 261a may be used so as to cause the recently used applications to be displayed on the touch screen 290 or to display a task manager.

The menu button 261b provides a context menu which may be displayed on the touch screen 290. In the context menu, for example, an another menu of widgets, a background change menu, a search menu, an edit menu, and an environment setting menu may be included.

The back button 261c may be used so as to display the screen which executed just prior to the currently executed screen or to cause the most recently used application to be finished.

A first camera 251, an illumination sensor 270a, and a proximity sensor 270b may be disposed at an edge of the front surface 201 of the portable terminal 200. On the rear surface 203 of the portable terminal 200, a second camera 252, a flash 253, and a speaker 263 may be disposed.

On the lateral surfaces 202 of the portable terminal 200, for example, a power/lock button 261d, a volume button 261e having a volume increase button 261f and a volume decrease button 261g, a terrestrial DMB antenna 241a for receiving broadcast, and one or more microphones 262 may be disposed. The DMB antenna 241a may be formed to be fixed to or to be detachable from the portable terminal 200.

In addition, on the bottom end surface of portable terminal 200, a connector 265 is formed. The connector 265 is formed with a plurality of electrodes and may be wiredly connected with an external device. On the top end surface of the portable terminal 200, an earphone connecting jack 267 may be formed. An earphone may be inserted into the earphone connecting jack 267.

In addition, an input device 100 may be mounted to the bottom end surface of the portable terminal 200. The input device 100 may be inserted into and kept in the inside of the portable terminal 200, and when used, may be drawn out and separated from the portable terminal 200.

Detailed constructions of a portable terminal 200 to which the present disclosure may be applied have been described above.

Hereinafter, an input device and method according to an embodiment of the present disclosure will be described with reference to FIGS. 14A to 18D.

Figure 14A:
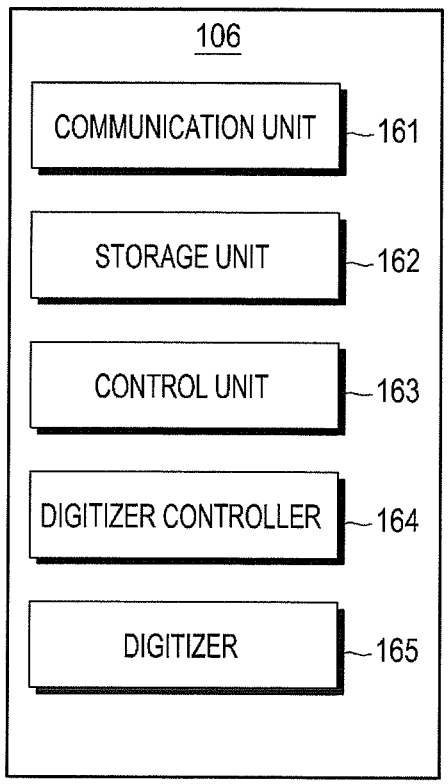
FIGS. 14A and 14B are block diagrams illustrating a detailed construction of an input panel according to an embodiment of the present disclosure.
Figure 14B:
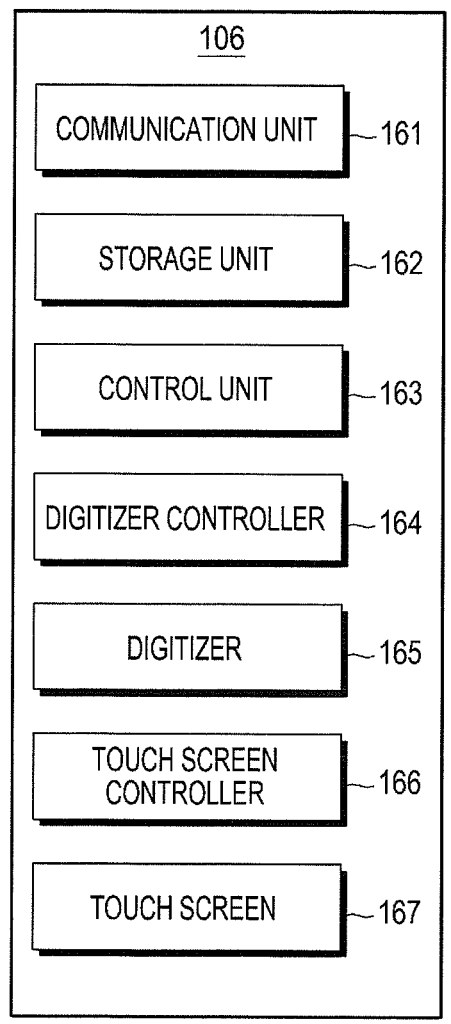

FIGS. 14A and 14B are block diagrams illustrating detailed constructions of input panels according to an embodiment of the present disclosure.

Referring to FIG. 14A, an input panel which may be combined with the input device 100 according to an embodiment of the present disclosure may include a communication unit 161, a storage unit 162, a control unit 163, a digitizer controller 164, and a digitizer 165. The digitizer 165 may detect a writing input of the input device 100 through an electromagnetic induction method. The digitizer 165 may generate a primary electromagnetic field. When the input device 100 is moved to the primary electromagnetic field region, an induced current may be generated in the induction coil of the input device 100 by the primary electromagnetic field. With the generated induced current, the circuit unit 101 of the input device 100 may generate a secondary electromagnetic field. Accordingly, the digitizer 165 may detect the writing input from the movement or variation of the secondary electromagnetic field of the input device 100.

The digitizer controller 164 converts an analog signal, for example, a writing pressure, detected by the digitizer 165 into a digital signal which is transmitted to the control unit 163.

The control unit 163 receives the digital signal from the digitizer controller 164 and may transmit the digital signal to an electronic device (not illustrated) through the communication unit 161. In addition, the control unit 163 may control the operation of the input panel 106.

The storage unit 162 may store the digital signal received from the digitizer controller 164 to be transmitted to the communication unit 161. The storage unit 162 may store information associated with operating each part of the input panel 106.

Referring to FIG. 14B, the input panel 106 may include a communication unit 161, a storage unit 162, a control unit 163, a digitizer controller 164, a digitizer 165, a touch screen controller 166, and a touch screen 167. The touch screen controller 166 and the touch screen 167 may be further included in the input panel 106 of FIG. 14A. Since the detailed descriptions of the touch screen controller 166 and the touch screen 167 are same as the descriptions of the touch screen controller 295 and the touch screen 290 of FIG. 11 and the descriptions of the other components are the same as those of FIG. 14A, the descriptions thereof will be omitted.

The input panel 106 may provide at least one user interface included in the writing mode of the electronic device through the touch screen 167. The touch screen 167 may determine which one is selected among the user interfaces of the writing mode by detecting user inputs such as an input by a contact of the user's body and an input by the input device. According to the selected user interface, the electronic device may execute a corresponding function.

Further, the input panel 106 may recognize the user's operation of turning over pages of an intermediate medium such as paper positioned on the top surface of the touch screen, for example, through the touch screen 167. How the operation of turning over pages of an intermediate medium is recognized in the electronic device will be described in detail below with reference to FIGS. 18A through 18D.

The components of the input device 100, the input panel and the electronic device 200 are separately illustrated in the drawings so as to represent that the individual components may be functionally and logically separated from each other, which does not mean that the components are necessarily separate components or implemented by separate codes.

In addition, each functional unit in the present disclosure may refer to a functional or structural combination of hardware for implementing the technical idea of the present disclosure and software for controlling the hardware. For example, a person ordinarily skilled in the art may easily conceive that each functional unit may mean a logical unit of predetermined codes and a hardware resource in which the predetermined codes are executed but not necessarily mean physically connected codes or one kind of hardware.

Hereinafter, a procedure of an input method using an input device of an electronic device according to an embodiment of the present disclosure will be described with reference to FIGS. 15 through 17.

Figure 15:
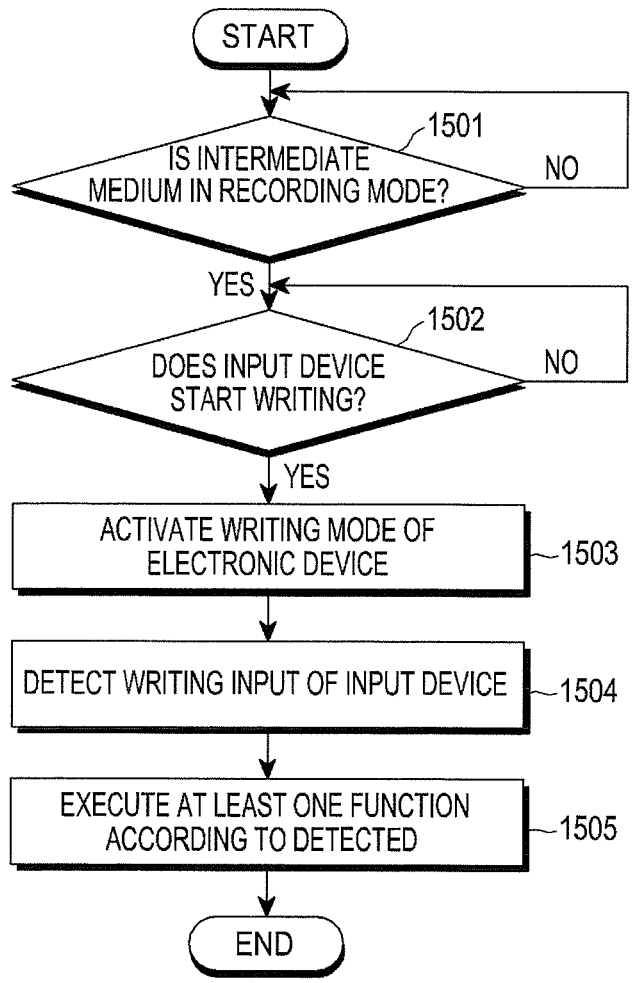
FIG. 15 is a flowchart illustrating a procedure of an input method using an input device according to an embodiment of the present disclosure.

FIG. 15 is a flowchart illustrating the procedure of an input method of an electronic device according to an embodiment of the present disclosure.

Referring to FIG. 15, first, the electronic device according to the present embodiment may determine whether an intermediate medium recording mode of the electronic device is activated or not (operation 1501). When the intermediate medium recording mode of the electronic device is activated, the electronic device may proceed with the next operation 1502. When the intermediate medium recording mode of the electronic device is not activated, the electronic device may stand by until the intermediate medium recording mode of the electronic device is activated. For example, when the intermediate medium recording mode of the electronic device is activated, the electronic device may be operated in the standby state in which a writing input which is input when writing is performed on the intermediate medium by the input device may be detected from the input device.

When the intermediate medium recording mode of the electronic device is activated, the electronic device may determine whether the input device starts writing (operation 1502). When it is determined that the input device has started writing, the electronic device may proceed with the operation of the next operation 1503. In another example, the electronic device may stand by until the input device starts writing. For example, the electronic device may sense a user input event such as a hovering event according to the approach of the input device to the touch screen or the digitizer or the positioning of the input device closer to the touch screen or the digitizer. The electronic device may determine the start of writing of the input device by sensing the hovering event. The intermediate medium may be positioned in a region where the hovering event may be sensed. For example, the input device is positioned in the hovering event sensing region of the electronic device and the intermediate medium may be positioned between the input device and the electronic device.

As a result of the determination, when it is determined that the input device has started writing, the electronic device may activate the writing mode among its operating modes (operation 1503). When the writing mode of the electronic device is activated, the electronic device may recognize the writing input of the input device. For example, the electronic device may activate the writing mode regardless of the operating state of the screen of the electronic device. Accordingly, the electronic device may activate the writing mode either in the state where the screen of the electronic device is turned OFF or in the state where the screen is turned ON.

When the writing mode of the electronic device is activated, the electronic device may detect the writing input of the input device (operation 1504). The electronic device may detect the writing input of the input device through any one of the input panels provided in the electronic device and an input panel which is independent from the electronic device. For example, when the writing mode of the electronic device is activated, the digitizer provided as an input panel may generate a primary electromagnetic field. The input device may generate a secondary electromagnetic field based on the primary electromagnetic field. The digitizer may detect the writing input by detecting the variation of the secondary electromagnetic field which is varied according to the writing input of the input device. The digitizer controller may convert an analog signal of the detected writing input into a digital signal and then transfer or transmit the digital signal to the control unit of the electronic device. Accordingly, the electronic device may detect the writing input of the input device. The electronic device may detect at least one of a special text, a text, a spot, a line, a figure, or a picture input though the input device.

The electronic device may execute at least one function which has been set in the electronic device in advance and corresponds to the detected writing input (operation 1505). For example, the electronic device may execute at least one function pre-set in the electronic device or corresponding to the detected writing input. First, the electronic device may search whether data corresponding to the detected writing input exists from the table stored in the storage unit. As a result of search, when the data corresponding to the detected writing input exists in the storage unit, the electronic device may extract the function execution data which causes at least one function mapped with the corresponding data from the table stored in the storage unit. The electronic device may execute the at least one function corresponding to the extracted function execution data. The data corresponding to the writing input may include at least one of a special text, a text, a spot, a line, a figure, or a picture. Further, the function execution data may include at least one command which causes the corresponding function to be executed.

Figure 16:
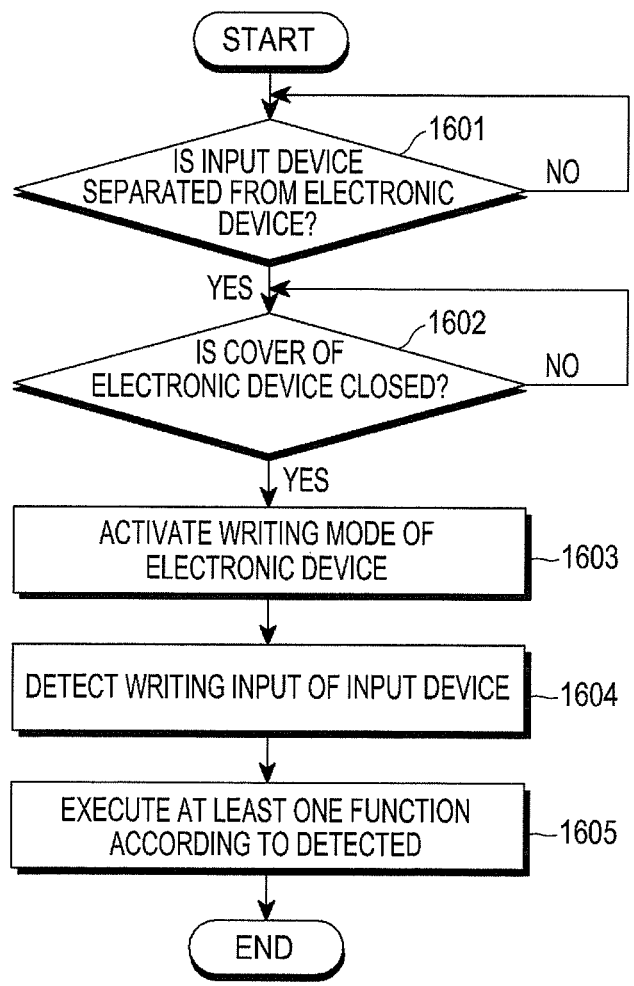
FIG. 16 is a flowchart illustrating a procedure of another input method using an input device according to an embodiment of the present disclosure.

FIG. 16 is a flowchart illustrating a procedure of another input method using an input device of an electronic device according to another embodiment of the present disclosure.

Referring to FIG. 16, first, the electronic device according to the present embodiment may determine whether the input device is separated from the electronic device (operation 1601). The electronic device may be provided with a space for accommodating the input device. When the input device is separated from the electronic device, the electronic device may proceed with the next operation 1602. As another example, when the input device is not separated from the electronic device, the electronic device may stand by until the input device is separated from the electronic device. For example, the electronic device may be provided with a switch within the space in which the input device is accommodated and the switch may generate a signal when the input device is separated from or engaged in the space. The electronic device may determine whether the input device is separated or engaged by receiving the signal related to the separation or engagement of the input device from the switch. The switch may be disposed at a position where it is in contact with the input device when the input device is engaged in the accommodation space of the electronic device.

In addition, the electronic device may determine whether the input device is engaged with the electronic device or separated from the electronic device by detecting the secondary electromagnetic field generated by the input device based on the primary electronic magnetic field generated by the input panel.

When it is determined that the input device is separated from the electronic device, the electronic device may determine whether the cover which covers the electronic device, for example, the cover part of a protection cover, is closed or opened (operation 1602). When the cover part is closed, the electronic device may execute the next operation 1603. As another example, when the cover part is not closed, the electronic device may stand by until the cover part is closed.

In addition, the electronic device may determine whether the cover part of the protection cover is closed through a magnetic sensor provided in the sensor unit. For example, the electronic device may measure the intensity of magnetic force of a magnetized portion included in the cover part. The electronic device may compare the intensity of magnetic force measured in the state where the cover part is closed and the intensity of magnetic force measured in the state where the cover part is opened. Accordingly, the electronic device may determine whether the protection cover of the electronic device is closed or opened based on the measured intensity of magnetic force.

Further, the electronic device may determine whether the cover part of the protection cover is closed through the illumination sensor provided in the sensor unit. For example, the electronic device may compare the illumination intensity measured in the state where the cover part of the protection cover is closed and the illumination intensity measured in the state where the cover part is opened. Accordingly, the electronic device may determine whether the protection cover of the electronic device is closed or opened based on the measured illumination intensity.

When it is determined that the cover part is closed, the electronic device may activate the writing mode among its operation modes (operation 1603). When the writing mode of the electronic device is activated, the electronic device may recognize the writing input of the input device. For example, the electronic device may activate the writing mode regardless of the operation state of the screen of the electronic device. Accordingly, the electronic device may activate the writing mode either in the state where the screen of the electronic device is turned OFF or in the state where the screen is turned ON.

When the writing mode of the electronic device is activated, the electronic device may detect the writing input of the input device (operation 1604). The electronic device may detect the writing input of the input device through any one of the input panel provided in the electronic device and an input panel which is independent from the electronic device. For example, when the writing mode of the electronic device is activated, the digitizer provided as an input panel may generate a primary magnetic field. The input device may generate a secondary electromagnetic field based on the primary electromagnetic field. The digitizer may detect the writing input by detecting the variation of the secondary electromagnetic field which varies according to the writing input of the input device. The digitizer controller may convert an analog signal of the detected writing input into a digital signal and then transfer or transmit the digital signal to the control unit of the electronic device. Accordingly, the electronic device may detect the writing input of the input device. The electronic device may detect at least one of a special text, a text, a dot, a line, a figure, or a picture which are writing-input through the input device.

The electronic device may execute at least one function which has been set in the electronic device in advance or corresponds to the detected writing input (operation 1605). For example, the electronic device may execute at least one function pre-set in the electronic device or corresponding to the detected writing input. First, the electronic device may search whether data corresponding to the detected writing input exists from the table stored in the storage unit. As a result of detection, when the data corresponding to the detected writing input exists in the storage unit, the electronic device may extract the function execution data which causes the at least one function mapped with the corresponding data from the table stored in the storage unit. The electronic device may execute the at least one function corresponding to the extracted function execution data. The data corresponding to the writing input may include at least one of a special text, a text, a dot, a figure, or a picture. In addition, the function execution data may include at least one command which causes the corresponding function to be executed.

In addition, the electronic device may further include an operation which finishes the writing mode of the electronic device when a writing input pre-set to correspond to the function of finishing the writing mode of the electronic device is input to the electronic device.

Also, the electronic device may further include a function of finishing the writing mode of the electronic device when a user interface of finishing the writing mode of the electronic device is selected.

Also, the electronic device may further include an operation of storing written contents according to a user input prior to finishing the writing mode.

In addition, the electronic device may further include an operation of periodically storing writing input data which is writing-input during the writing mode operation of the electronic device to the storage unit. The electronic device may recover the writing input data which has been input previously when executing the next writing mode. For example, the writing mode of the electronic device may be finished abnormally. The situations in which the writing mode is finished abnormally may include a situation in which the electronic device is ended forcibly and a situation in which the power of the electronic device is cut off and thus, the operation of the electronic device is ended. Even if the writing mode of the electronic device is abnormally finished, the electronic device may recover the previously input writing input data when executing the next writing mode. The period for storing the writing input data which is writing-input during the writing mode operation of the electronic device may be set in advance by the user.

FIG. 17 is a flowchart illustrating a procedure of another input method using an input device of an electronic device according to another embodiment of the present disclosure.

Referring to FIG. 17, first, the electronic device according to the present embodiment may determine whether the input device is separated from the electronic device (operation 1701). The electronic device may be a space which may accommodate the input device. When the input device is separated from the electronic device, the electronic device may proceed with the next operation 1702. As another example, when the input device is not separated from the electronic device, the electronic device may stand by until the input device is separated from the electronic device. For example, the electronic device may be provided with a switch in the inside of the space which may accommodate the input device and the switch may generate a signal when the input device is separated from or engaged in the space. The electronic device may determine whether the input device is engaged with or separated from the electronic device by receiving the signal related to the separation or engagement of the input device from the switch. The switch may be disposed at a position in the accommodation space of the electronic device where the switch is in contact with the input device when the input device is engaged in the accommodation space.

In addition, the electronic device may determine whether the input device is engaged with or separated from the electronic device by detecting the secondary electromagnetic field generated by the input device based on the primary electromagnetic field generated by the input panel.

When it is determined that the input device is separated from the electronic device, the electronic device may determine whether the cover that closes the electronic device, for example, the cover part of the protection cover, is closed (operation 1702). When the cover part is closed, the electronic device may execute the operation of the next operation 1703. As another example, when cover part is not closed, the electronic device may stand by until the cover part is closed.

In addition, the electronic device may determine whether the cover part of the protection cover is closed through a magnetic sensor provided in the sensor unit. For example, the electronic device may measure the intensity of magnetic force of a magnetized portion included in the cover part. The electronic device may compare the intensity of magnetic force measured in the state where the cover part is closed and the intensity of magnetic force measured in the state where the cover part is opened. Accordingly, the electronic device may determine whether the protection cover of the electronic device is closed or opened based on the measured intensity of magnetic force.

In addition, the electronic device may determine whether the cover part of the protection cover is closed through the illumination sensor provided in the sensor unit. For example, the electronic device may compare the illumination intensity measured in the state where the cover part of the protection cover is closed and the illumination intensity measured in the state where the cover part is opened. Accordingly, the electronic device may determine whether the protection cover of the electronic device is closed or opened based on the measured illumination intensity.

When it is determined that the cover part of the electronic device is closed, the electronic device may activate the writing mode among its operation modes (operation 1703). When the writing mode of the electronic device is activated, the electronic device may recognize the writing input of the input device. For example, the electronic device may activate the writing mode regardless of the operating state of the screen of the electronic device. Accordingly, the electronic device may activate the writing mode either in the state where the screen of the electronic device is turned OFF or in the state where the screen is turned ON.

In the state where the writing mode of the electronic device is activated, the electronic device may determine whether the input device is engaged with the electronic device again (operation 1704). When the electronic device is engaged with the input device, the electronic device may proceed with the next operation 1708. As another example, when the electronic device is not engaged with the input device, the electronic device may proceed with the next operation 1705. For example, the electronic device may be provided with a switch within the space where the input device may be accommodated and the switch may generate a signal when the input device is separated from or engaged in the space. The electronic device may determine whether the input device is engaged with or separated from the electronic device by receiving the signal related to the separation or engagement of the input device from the switch. The switch may be disposed at a position in the accommodation space of the electronic device where the switch is in contact with the input device when the input device is engaged in the accommodation space.

In addition, the electronic device may determine whether the input device is engaged with or separated from the electronic device by detecting the secondary electromagnetic field generated by the input device based on the primary electromagnetic field generated by the input panel.

When the input device is engaged with the electronic device, the electronic device may store a writing input (operation 1708). After completing the operation of storing the writing input the electronic device may proceed with operation 1701 again. For example, the electronic device may detect the writing input of the input device through at least one of the input panel provided in the electronic device or an input panel which is independent from the electronic device. The input panel may convert the detected writing input into a digital signal and transfer or transmit the digital signal to the electronic device. The input panel may store the detected writing input of the input device in the storage unit of the input panel. Accordingly, when the electronic device and the input device are engaged with each other, the electronic device may store the writing input of the input device transferred or transmitted from the input panel in the storage unit of the electronic device.

When the electronic device and the input device are not engaged with each other, the electronic device may detect the writing input of the input device (operation 1705). The electronic device may detect the writing input of the input device through any one of the input panel provided in the electronic device and an input panel which is independent from the electronic device. For example, when the writing mode of the electronic device is activated, the digitizer provided as an input panel may generate a primary electromagnetic field. The input device may generate a secondary electromagnetic field based on the primary electromagnetic field. The digitizer may detect the writing input by detecting the variation of the secondary electromagnetic field which varies according to the writing input of the input device. The digitizer controller may convert an analog signal of the detected writing input into a digital signal and then, transfer or transmit the digital signal to the control unit of the electronic device. Accordingly, the electronic device may detect the writing input of the input device. The electronic device may detect at least one of a special text, a text, a dot, a line, a figure, or a figure which are writing-input through the input device.

The electronic device may execute at least one function which has been set in the electronic device in advance or corresponds to the detected writing input (operation 1706). For example, the electronic device may execute the at least one function pre-set in the electronic device or corresponding to the detected writing input. First, the electronic device may search whether data corresponding to the detected writing input exists in the table stored in the storage unit. As a result of the search, when the data corresponding to the detected writing input exists, the electronic device may extract the function execution data which causes the at least one function mapped with the corresponding data to be executed from the table stored in the storage unit. The electronic device may execute the at least one function corresponding to the extracted function execution data. The data corresponding to the writing input may include at least one of a special text, a text, a dot, a line, a figure, or a picture. In addition, the function execution data may include at least one command which causes the corresponding function to be executed.

The electronic device may determine whether a command to finish the writing mode of the electronic device is received (operation 1707). When the command to finish the writing mode of the electronic device is received, the electronic device may proceed with operation 1708. When the command to finish the writing mode of the electronic device is not received, the electronic device may proceed with operation 1703 again. For example, the electronic device may finish the writing mode of the electronic device when a writing input pre-set to correspond to a function of finishing the writing mode of the electronic device in the electronic device. As another example, when a user interface function of finishing the writing mode of the electronic device is selected in the electronic device, the electronic device may finish the writing mode of the electronic device.

Also, the electronic device may further include an operation of storing written contents according to a user input prior to finishing the writing mode.

In addition, the electronic device may further include an operation of periodically storing writing input data which has been writing-input during the writing mode operation of the electronic device. The electronic device may recover the previously input writing input data when executing the next writing mode. For example, the writing mode of the electronic device may be abnormally finished. The situations in which the writing mode is abnormally finished may include a situation in which the operation of the electronic device is forcibly finished and a situation in which the power of the electronic device is cut off and thus, the operation of the electronic device is finished. Even if the writing mode of the electronic device is abnormally finished, the electronic device may recover the previously input writing input data when executing the next writing mode. The period of storing the writing input data which has been writing-input during the writing mode operation of the electronic device in the storage unit may be set in advance by the user.

In the embodiments described with reference to FIGS. 16 and 17 above, a scenario has been described in which the electronic device determines whether the electronic device and the detachable input device are engaged with or separated from each other. However, the present disclosure is not limited to this and in a modified example, the electronic device may determine whether an input panel which is independent from the electronic device is engaged with or separated from the input device. For example, the input panel which is independent from the electronic device may be provided with a space in which the input device may be accommodated. The space may be provided with a switch which may sense whether the input device is engaged in or separated from the space. As another example, the input panel which is independent from the electronic device may detect an electromagnetic field from the input device. The input panel which is independent from the electronic device may convert the information of the detected electromagnetic field of the input device into a digital signal and transmit the digital signal to the electronic device. The electronic device may determine whether the input panel which is independent from the electronic device and the input device are engaged with or separated from each other based on the electromagnetic information of the input device received from the input panel.

Hereinbefore, an input method using an input device of an electronic device according to an embodiment of the present disclosure has been described with reference to FIGS. 15 to 17.

The above-described input methods using the input devices of electronic devices according to various embodiments of the present disclosure may be implemented in a program command form which may be executed by various computer means and may be recorded in a computer-readable medium. The computer-readable medium may include a program command, a data file, a data structure, or a combination thereof. The program commands recorded in the medium may be those especially designed and configured for the present disclosure or those known to a person ordinarily skilled in the computer software field to be capable of being used. The examples of the computer-readable recording medium include magnetic medium such as a hard disc, a floppy disc or a magnetic tape, optical recording mediums such as a CD-ROM or a DVD, a magneto-optical recording medium such as a floptical disk, and a hardware device which are specially configured such that a program may be stored therein and executed like a ROM, a RAM, a flash memory or the like. The examples of program commands include not only machine language codes made by, for example, a compiler but also high level language codes which may be executed by a computer using an interpreter. The above-described hardware devices may be configured to operate as one or more software modules to execute the operations of the present disclosure and the converse is equally true.

Hereinafter, examples of processing writing inputs in an electronic input according to an embodiment of the present disclosure will be described with reference to FIGS. 18A through 19D.

FIGS. 18A through 18D illustrate an example of processing writing inputs in an electronic device according to an embodiment of the present disclosure.

The input panel may detect a writing input even if an intermediate medium exists between the input device and the input panel. The input panel may detect a writing input when the input device is positioned within a predetermined range. The predetermined range refers to a range in which the input device may generate a secondary electromagnetic field under the influence of a primary electromagnetic field generated by the input panel. The input panel may detect a writing input even if an intermediate medium is positioned within the range.

According to an embodiment of the present disclosure, the intermediate medium may be made up of a material through which the primary electromagnetic field and the secondary electromagnetic field may pass. The input panel may recognize a writing input by the writing of the input device from the intermediate medium through which the secondary electromagnetic field may pass.

Also, the intermediate medium may be made up of a material which is hardly affected by the primary electromagnetic field and the secondary electromagnetic field. For example, even if the intermediate medium such as paper is positioned on the top of the input panel and the input device is positioned on the paper, the input panel may detect the writing input by the writing of the input device.

When the cover part of the protection cover of the electronic device is closed, the operation mode of the electronic device may enter into the intermediate medium recording mode. However, the intermediate medium recording mode of the electronic device according to various example embodiments of the present disclosure is not limited to this, and the electronic device may determine whether the input device starts a write input regardless of the state of the protection cover of the electronic device.

In addition, when the writing of the input device is started, the electronic device may detect the writing input which is written by the user on the intermediate medium through the input device. For example, the intermediate medium such as paper may be positioned on the top of the input panel of the electronic device or an input panel which is independent from the electronic device. The input device may include a recording member such as a ball point pen or a pencil which enables writing on the intermediate medium. The user may perform a write input on the intermediate medium using the input device.

Referring to FIG. 18A, a process of hand-writing a writing input 1801 on the intermediate medium by the input device is illustrated. The writing input 1801 may be written on the intermediate medium by the input device. The writing input 1801 may be at least one of a special text, a text, a figure, a symbol, a picture, a dot, or a line. In order to correct a part of the hand-written writing input 1801, a cancel line 1802 among correction symbols may be further hand-written on the portion desired to be deleted from the writing input 1801. An further writing input 1803 may be hand-written adjacent to the cancel line 1802 by the input device.

Referring to FIG. 18B, a process is illustrated in which the writing input 1801, the cancel line 1802 and the further input writing input 1803 which are hand-written on the intermediate medium, are detected by the input panel and reflected to the writing mode of the electronic device.

The electronic device may recognize the writing on the intermediate medium by the input device. The electronic device may recognize at least one correction symbol which is further written on at least one written text or process at least one function mapped with at least one text according to the recognized correction symbol or pre-set in the electronic device. The function of the correction symbol may be at least one of inter-character spacing, deletion, text change, place change, insertion, line connection, indenting, outdenting, drawing down, drawing up, or deleted content recalling. The functions of correction symbols may be mapped with at least one of a text, a figure, and a symbol or stored in the storage unit of the electronic device.

When the processing is executed according to at least one of the functions pre-set in the electronic device, a correction mode is activated and the position of the at least one written text or the position of the further input writing input may be rearranged. For example, when the cancel line 1802 is further hand-written on a portion desired to be deleted from the hand-written writing input 1801 among the correction symbols in order to correct a part of the writing input 1801 hand-written using the input device, the electronic device may recognize the cancel line 1802 and then delete the portion of the writing input 1801 overlapping with the cancel line 1802. When an further writing input 1803 is further hand-written adjacent to the cancel line 1802 using the input device, the electronic device may recognize the further writing input 1803 and dispose the further writing input 1803 above the position of the deleted writing input 1801. The electronic device may reflect the angle or the like of the writing input 1801 and may rearrange the further writing input 1803 to the position of the deleted writing input 1801 in consideration of the angle. The electronic device may recognize the correction symbol and execute a function mapped with the correction symbol so as to a corrected writing input 1805 to the writing mode.

Referring to FIG. 18C, a process of hand-writing a function text 1806 and a writing input 1807 on the intermediate medium using the input device is illustrated. Using the input device, the function text 1806 and the writing input 1807 may be hand-written on the intermediate medium. The writing input 1807 may be at least one of a special text, a text, a figure, a symbol, a picture, a dot, or a line.

Using the input device, at least one function text 1806 mapped with at least one function pre-set in the electronic device or a function execution symbol 1808 which instructs execution of the at least one function may be further hand-written on the intermediate medium.

The function text 1806 may be mapped with at least one function pre-set in the electronic device. For example, when "tel" is written on the intermediate medium using the input device, it may be mapped with a function of making a call of the electronic device. When "mms" is written on the intermediate medium using the input device, it may be mapped with a multimedia message service function of the electronic device. When "-" is written on the intermediate medium using the input device, numbers in which "-" is written may be stored in a phone book of the electronic device.

Referring to FIG. 18D, a process is illustrated in which a function text 1806, a writing input 1807, and a function execution function 1808 which are written on the intermediate medium by hand-writing, are detected by the input panel, and at least one function of the electronic device in which the detected writing is reflected is executed. When the function text 1806 and the function execution symbol 1808 are written on the intermediate by hand-writing, the electronic device may recognize the writing in a recognition region 1809 and execute the function mapped with the recognized function text 1806. Accordingly, the electronic device may produce an attached file which includes the contents written on the intermediate medium, extract an e-mail address matched with the writing within the recognition region 1809, and forward an e-mail to the corresponding address.

Further, when one or more commas exist in the writing within the recognition region 1809, the electronic device may recognize that the e-mail may be forwarded to plural addressees, extract e-mail addresses which are matched to those written between the commas, respectively, from the storage units, and then forward the attached file including the contents written on the intermediate medium to the corresponding addresses.

In addition, a specific writing and at least one function of the electronic device may be mapped with each other by the user's setting. The electronic device may recognize the writing and execute the at least one function mapped with the writing.

The electronic device illustrated in FIGS. 18A to 18D may determine whether the intermediate medium recording mode of the electronic device is activated. When it is determined that the electronic device is operated in the intermediate medium recording mode, the electronic device may determine whether the writing of the input device is started. When it is determined that the writing of the input device is started, the electronic device may detect the writing input. The electronic device may execute the at least one function of the electronic device corresponding to the detected writing input. For example, when the cover part of the protection cover is closed, the electronic device may activate the intermediate medium recording mode of the electronic device. When the input device is positioned within a region where a hovering event of the input panel may be sensed, the electronic device may determine that the writing of the input device is started.

Further, the electronic device may activate the intermediate medium recording mode of the electronic device according to the variation of the position of the input device. For example, the electronic device may determine whether the input device is engaged in or separated from any one of the input device accommodation space provided in the electronic device and the input device accommodation space provided in the input panel. When it is determined that the input device is separated from any one of the input device accommodation space provided in the electronic device and the input device accommodation space provided in the input panel, the electronic device may activate the intermediate medium recording mode of the electronic device.

In addition, the electronic device may activate the operation mode of the electronic device as the intermediate medium recording mode or the writing mode in the state where the screen of the electronic device is turned OFF.

Accordingly, the user may turn ON the screen of the electronic device and perform a writing input without needing to execute the writing mode through the input device. In addition, the user may intuitively confirm the contents written by the user by hand-writing through the intermediate medium.

FIGS. 19A through 19D illustrate an example in which the electronic device recognizes an action of turning over the pages of the intermediate medium according to an embodiment of the present disclosure.

The electronic device according to the present embodiment may recognize the user's action of turning over the pages of an intermediate medium 1901 such as paper which is in close contact with the top surface of the input panel 106. When the pages of the intermediate medium 1901 are turned over, the electronic device may store the writing input by the writing using the input device. After storing the writing input, the electronic device may produce and activate a page of a new writing mode.

When pressure is applied to a contact point of the intermediate medium 1901 by the user's contact, the electronic device may detect the position of the contact point where the pressure is applied. The user's contact may include a contact by a part of the user's body (e.g., a contact by a finger) and a contact by the input device. For example, the intermediate medium 1901 may be positioned on the top surface of the input panel 106. The input panel 106 may detect a contact point where the pressure of the touch screen is applied including the touch screen and the touch screen controller. Pressure may be applied to the contact point of the intermediate medium 1901 by the user's contact. The pressure may be transferred to a contact point of the touch screen of the input panel 106 positioned to be in close contact with the underside of the specific point of the intermediate medium 1901. Accordingly, when the pressure is applied to the contact point of the intermediate medium by the user's contact, the electronic device may detect the position of the contact point where the pressure is applied through the input panel.

Referring to FIGS. 19A to 19D, when pressure is applied to the intermediate medium 1901 at a contact point by the user's contact, the charge amount at the contact point on the input point 106 is changed. Accordingly, the input panel may detect the contact occurring at a specific point on the intermediate medium 1901. For example, when contact occurs at a first point 1902 and a second point 1903 on the intermediate medium 1901, the charge amounts at the first point 1906 and the second point 1907 of the touch screen 1905 of the input panel 106 which correspond to the first point 1902 and the second point 1903 on the intermediate medium 1901 are changed. The first point 1906 of the touch screen 1905 of the input panel 106 is positioned underside the first point 1902 of the intermediate medium 1901, and the second point 1907 of the touch screen 1905 of the input panel 106 is positioned underside of the second point 1903 of the intermediate medium 1901. The input panel 106 may detect the variation of the charge amounts at the first point 1906 and the second point 1907 of the touch screen 1905. When one of the first point 1902 and the second point 1903 of the intermediate medium 1901 is moved to the position of the remaining other point, the point corresponding to one of the first point 1906 and the second point 1907 of the touch screen 1905 of the input panel 106 is moved to the position of the remaining other point. Accordingly, the electronic device may recognize the page turning action of the intermediate medium 1901. When the pages of the intermediate medium 1901 are turned over, the electronic device may store a writing input by the writing using the input device. After the writing input is stored, the electronic device may produce and activate a page of a new writing mode.

Further, the electronic device may recognize the page turning action of the intermediate medium 1901 through an input panel which includes a touch screen and a touch screen panel provided separately from the electronic device.

In addition, even if a third point 1907 of the touch screen 1905 of the input panel 106 due to the pressure of a third point 1904 of the intermediate medium 1901 other than the first point 1906 and the second point 1907 of the touch screen 1905 of the input panel 106, which were previously detected, is detected when the page turning action of the intermediate medium 1901 is recognized, the electronic device may exclude the third point 1907 when recognizing the page turning action of the intermediate medium.

The input devices according to various example embodiments of the present disclosure may enable writing on an intermediate medium such as paper and the written contents may be instantly converted into a digitized image or document.

Although the present disclosure has been described with an example embodiment, various changes and modifications may be suggested to one skilled in the art. It is intended that the present disclosure encompass such changes and modifications as fall within the scope of the appended claims.

What is claimed is:

1. An input device for an electronic device, the input device comprising:
a circuit unit including a reactance element with a variable reactance;
a stylus body configured to accommodate the circuit unit;
a tip disposed on an end of the stylus body;
a recording member configured to record on an intermediate medium and coupled with the reactance element;
a writing tool body configured to accommodate the recording member; and
an accommodation recess formed on a side surface of the writing tool body,
wherein the stylus body is detachably provided in the accommodation recess, and when the stylus body is mounted in the accommodation recess, the stylus body is maintained in a state in which the stylus body is in contact with the tip such that a writing pressure is transferred to the reactance element through the tip, and
wherein, as a recording on the intermediate medium proceeds, the writing pressure is transferred to the recording member so that the reactance of the reactance element varies.

2. The input device of claim 1, wherein the circuit unit comprises a resonance circuit unit including an induction coil.

3. The input device of claim 1, wherein the recording member includes a writing member which enables writing on paper.

4. The input device of claim 1, wherein the intermediate medium includes paper.

5. The input device of claim 1, further comprising a connection member affixed to the recording member and configured to transfer the writing pressure to the tip.

6. The input device of claim 1, further comprising:
a tip member detachably disposed at the end of the recording member.

7. The input device of claim 1, further comprising:
a connection member affixed to the recording member and configured to transfer the writing pressure to the reactance element,
wherein the connection member is coupled to at least partially wrap the outer circumferential surface of the recording member.

8. The input device of claim 7, further comprising:
a fastening protrusion formed on the connection member, wherein the fastening protrusion is engaged with the outer circumferential surface of the recording member.

9. The input device of claim 1, wherein the circuit unit is configured to generate a secondary electromagnetic field based on a primary electromagnetic field generated by the input panel, and the input panel is configured to detect a writing input of the recording member based on the secondary electromagnetic field.

10. The input device of claim 9, wherein the input panel includes a display panel installed on a portable electronic device.

11. The input device of claim 9, wherein the input panel comprises a digitizer wiredly or wirelessly connected with a portable electronic device.

12. An input method of an electronic device, the method comprising:
determining whether the electronic device is in an intermediate medium recording mode in which writing on an intermediate medium is enabled through an input device; comprising:
a circuit unit including a reactance element with a variable reactance;
a stylus body configured to accommodate the circuit unit;
a tip disposed on an end of the stylus body;
a recording member configured to record on the intermediate medium and coupled with the reactance element;
a writing tool body configured to accommodate the recording member; and
an accommodation recess formed on a side surface of the writing tool body,
wherein the stylus body is detachably provided in the accommodation recess, and when the stylus body is mounted in the accommodation recess, the stylus body is maintained in a state in which the stylus body is in contact with the tip such that a writing pressure is transferred to the reactance element through the tip, and
wherein, as a recording on the intermediate medium proceeds, the writing pressure is transferred to the recording member so that the reactance of the reactance element varies;
determining whether the input device starts writing;
activating a writing mode of the electronic device when the input device starts the writing;
detecting an input by the writing of the input device; and
executing at least one function pre-set in the electronic device according to the detected input.

13. The input method of claim 12, further comprising:
determining whether the input device is separated from the electronic device prior to determining whether the input device starts writing; and
performing the determining whether the input device starts writing when the input device is separated.

14. The input method of claim 12, further comprising:
detecting a variation of a charge amount by contact applied to the intermediate medium; and
producing a page of a new writing mode when the contact is applied to first and second points of the intermediate medium where the contact and the position of one point is moved to the other point in the first and second points.

15. The input method of claim 12, wherein, when executing the at least one function pre-set in the electronic device, the writing is recognized, at least one correction symbol further written on at least one written text is recognized, and the at least one text is processed according to the at least one function pre-set in the electronic device to be mapped with the correction symbol.

16. A computer program product including a non-transitory computer-readable recording medium encoded with computer-executable instructions that when executed cause a controller to perform the operations of:
determining whether the electronic device is in an intermediate medium recording mode in which writing on an intermediate medium is enabled through an input device; comprising:

a circuit unit including a reactance element with a variable reactance;

a stylus body configured to accommodate the circuit unit;

a tip disposed on an end of the stylus body;

a recording member configured to record on the intermediate medium and coupled with the reactance element;

a writing tool body configured to accommodate the recording member; and an accommodation recess formed on a side surface of the writing tool body, wherein the stylus body is detachably provided in the accommodation recess, and when the stylus body is mounted in the accommodation recess, the stylus body is maintained in a state in which the stylus body is in contact with the tip such that a writing pressure is transferred to the reactance element through the tip, and wherein, as a recording on the intermediate medium proceeds, the writing pressure is transferred to the recording member so that the reactance of the reactance element varies;

determining whether the input device starts writing;

activating a writing mode of the electronic device when the input device starts the writing;

detecting an input by the writing of the input device; and executing at least one function pre-set in the electronic device according to the detected input.

\* \* \* \* \*